(12) United States Patent
Kassemi et al.

(10) Patent No.: US 11,699,148 B2
(45) Date of Patent: Jul. 11, 2023

(54) EMAIL ADDRESS TOKEN INTEGRATION

(71) Applicant: Swoop IP Holdings LLC, Wilmington, DE (US)

(72) Inventors: James Kassemi, Albuquerque, NM (US); John P. Killoran, Jr., Albuquerque, NM (US); Chad Person, Albuquerque, NM (US); Isaiah Baca, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 445 days.

(21) Appl. No.: 14/757,610

(22) Filed: Dec. 23, 2015

(65) Prior Publication Data

US 2016/0180334 A1    Jun. 23, 2016

Related U.S. Application Data

(60) Provisional application No. 62/096,440, filed on Dec. 23, 2014.

(51) Int. Cl.
*G06Q 20/38*   (2012.01)
*G06Q 20/40*   (2012.01)

(52) U.S. Cl.
CPC ......... *G06Q 20/382* (2013.01); *G06Q 20/385* (2013.01); *G06Q 20/405* (2013.01)

(58) Field of Classification Search
None
See application file for complete search history.

(56) References Cited

U.S. PATENT DOCUMENTS

| | | |
|---|---|---|
| 5,960,411 A | 9/1999 | Hailman et al. |
| 6,101,485 A | 8/2000 | Fortenberry et al. |
| 6,167,435 A | 12/2000 | Druckenmiller et al. |
| 6,360,254 B1 * | 3/2002 | Linden .................. G06F 21/31 709/219 |
| 7,177,825 B1 | 2/2007 | Borders et al. |
| 7,257,536 B1 | 8/2007 | Finley et al. |

(Continued)

OTHER PUBLICATIONS

Postel, "Simple Mail Transfer Protocol", Information Sciences Institute University of Southern California, Aug. 1982 (Year: 1982).*

*Primary Examiner* — Steven S Kim
*Assistant Examiner* — Jason B Fenstermacher
(74) *Attorney, Agent, or Firm* — Volpe Koenig

(57) ABSTRACT

A system and method to facilitate transactions between a customer and a vendor is disclosed. The system and method include receiving a response email, wherein the response email includes a short lookup token associated with the transaction between a customer and a vendor; determining the long token associated with the short lookup token; decoding the long token; performing a validation of the decoded long token; and processing the transaction, on a condition that validation is approved. A system and method may also include receiving an email, the email includes a short lookup token integrated into the string of characters that compose the email address and is associated with the transaction between a customer and a vendor; determining a long token associated with the short lookup token; decoding the long token; performing a validation of the decoded long token; and processing the transaction, on a condition that validation is approved.

18 Claims, 23 Drawing Sheets

(56) References Cited

U.S. PATENT DOCUMENTS

| | | | |
|---|---|---|---|
| 8,538,845 B2 | 9/2013 | Liberty | |
| 8,606,703 B1 | 12/2013 | Dorsey et al. | |
| 8,725,635 B2 | 5/2014 | Klein et al. | |
| 8,762,272 B1 | 6/2014 | Cozens et al. | |
| 9,189,785 B2 | 11/2015 | Liberty et al. | |
| 9,208,488 B2 | 12/2015 | Liberty | |
| 9,652,769 B1* | 5/2017 | Golin | G06Q 20/38215 |
| 9,892,386 B2 | 2/2018 | Liberty | |
| 9,911,150 B2 | 3/2018 | Kassemi et al. | |
| 10,395,223 B2 | 8/2019 | Muthu | |
| 10,515,345 B2 | 12/2019 | Koh et al. | |
| 2004/0024823 A1* | 2/2004 | Del Monte | G06Q 10/107 709/206 |
| 2004/0054887 A1* | 3/2004 | Paulsen, Jr. | G06Q 10/107 713/154 |
| 2005/0254514 A1* | 11/2005 | Lynn | H04L 63/0846 370/450 |
| 2006/0253335 A1 | 11/2006 | Keena et al. | |
| 2007/0255620 A1 | 11/2007 | Tumminaro et al. | |
| 2007/0299920 A1* | 12/2007 | Crespo | H04L 51/28 709/206 |
| 2009/0006233 A1 | 1/2009 | Chemtob | |
| 2009/0144161 A1 | 6/2009 | Fisher | |
| 2009/0171792 A1* | 7/2009 | Mayo | G06Q 30/06 705/40 |
| 2009/0282108 A1* | 11/2009 | Sachtjen | G06Q 10/107 709/206 |
| 2010/0070419 A1 | 3/2010 | Vadhri | |
| 2010/0094755 A1 | 4/2010 | Kloster | |
| 2010/0312664 A1* | 12/2010 | Roseman | G06Q 30/06 705/26.3 |
| 2012/0116967 A1* | 5/2012 | Klein | G06Q 20/108 705/42 |
| 2012/0130898 A1 | 5/2012 | Snyder et al. | |
| 2012/0253896 A1* | 10/2012 | Killoran, Jr. | G06Q 10/107 705/14.4 |
| 2012/0290490 A1 | 11/2012 | Young et al. | |
| 2013/0198018 A1* | 8/2013 | Baig | G06Q 20/20 705/16 |
| 2013/0318348 A1 | 11/2013 | Lebron et al. | |
| 2014/0189820 A1* | 7/2014 | Pieczul | H04L 63/08 726/5 |
| 2015/0304250 A1* | 10/2015 | Zomet | G06Q 30/0277 705/14.72 |
| 2015/0339656 A1* | 11/2015 | Wilson | G06Q 20/3226 705/44 |

\* cited by examiner

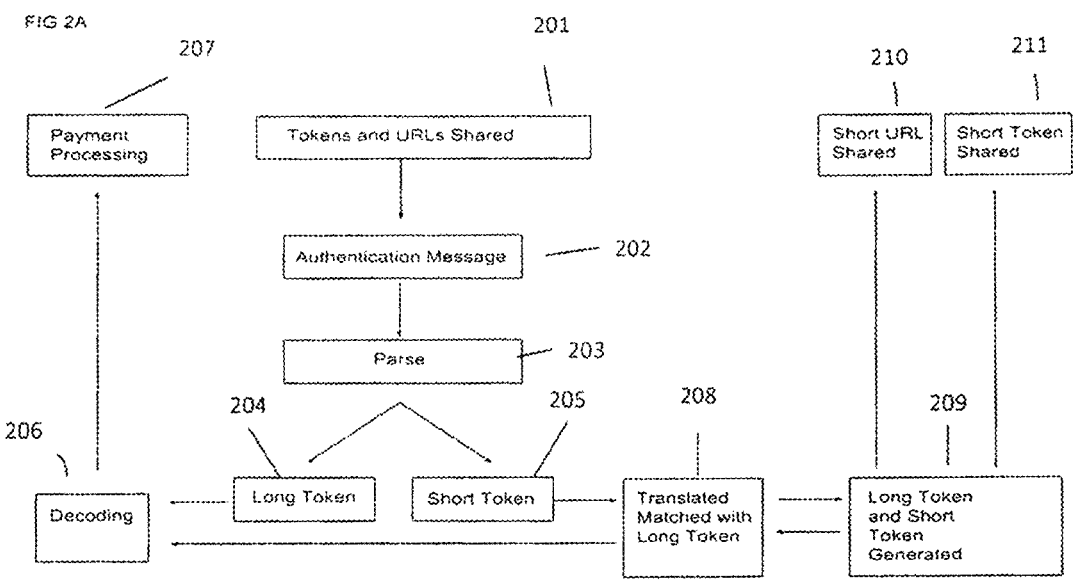

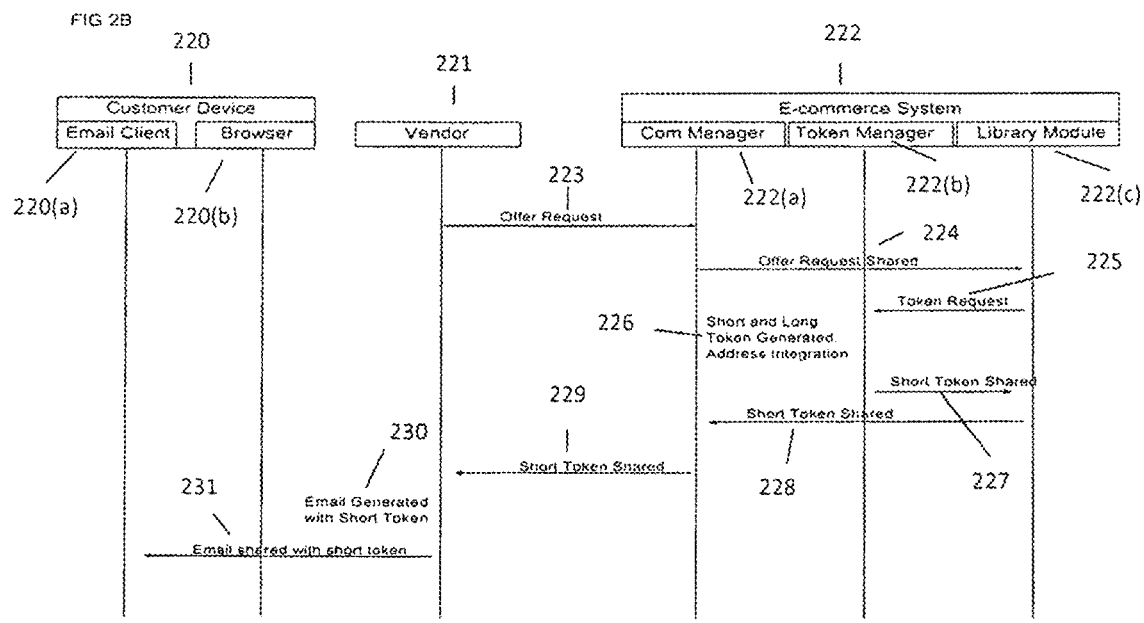

●●○○○ Verizon 🛜  11:43 AM  ⬈ 🔋
❮ Back (1537)  ⌄
From: USA Cable Billing    Hide
To: Patrick Killoran
USA Cable: Email-Based Payment
December 1, 2014 at 11:42 AM
Dear Valued Customer,
Pay your cable bill of $76.56 by clicking the button below and sending the email.
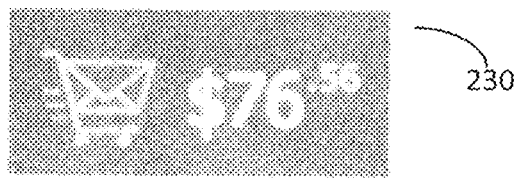
— 230
FIGURE 2C
    

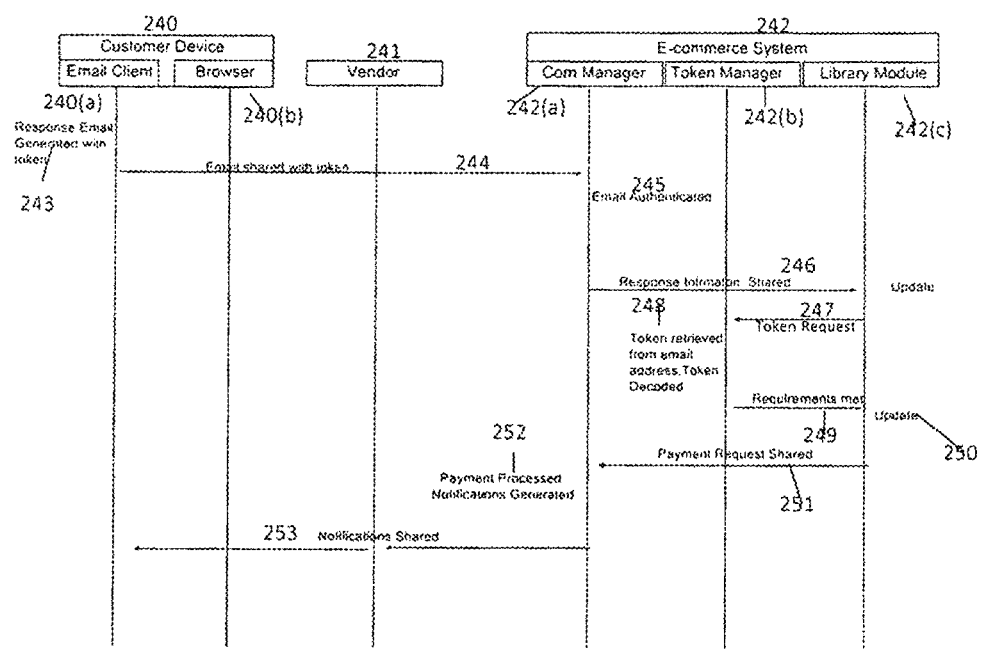

••ooo Verizon 📶　　11:08 AM　　✈ 🔋

Cancel Press send to pay $76.... Send

260 —— To: payment-id-1C84265F-38...

Cc/Bcc, From: killoran@mindspring...

Subject: Press send to pay $...

USA Cable makes it easy to pay. Simply press "send" to confirm your payment of $76.56. If we need more info, we will let you know. Thanks!

Powered by @Pay

FIG. 2E

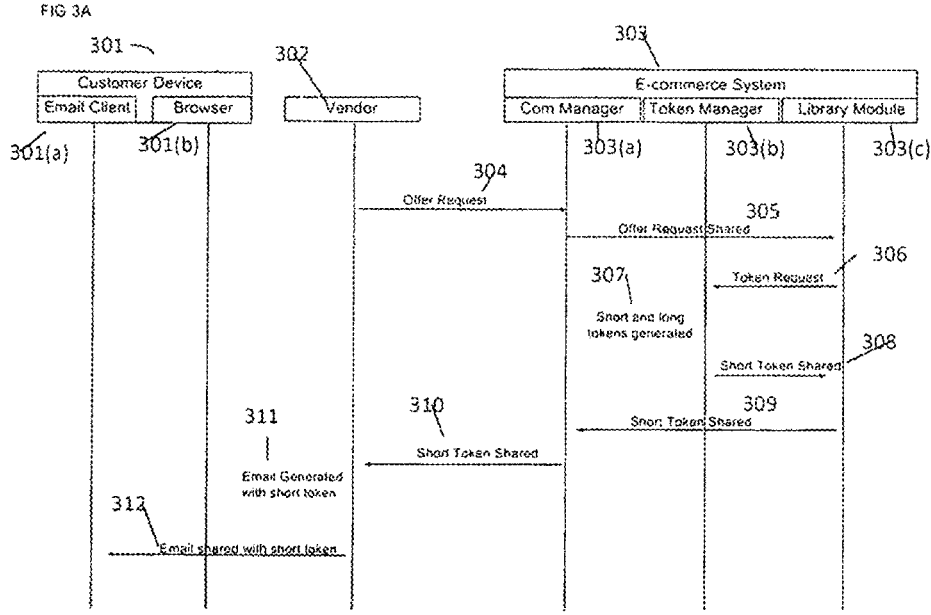

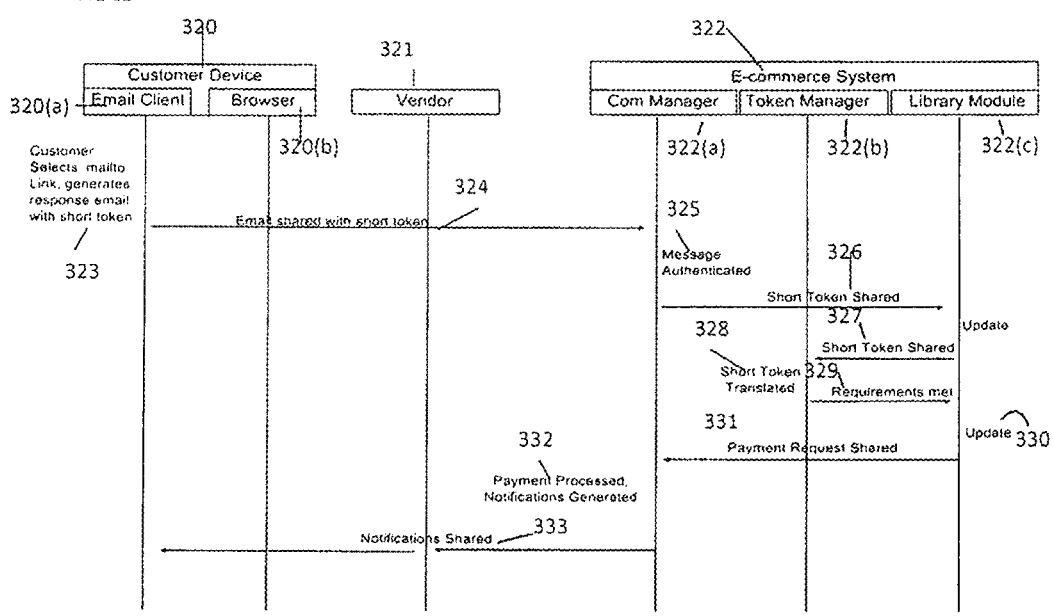

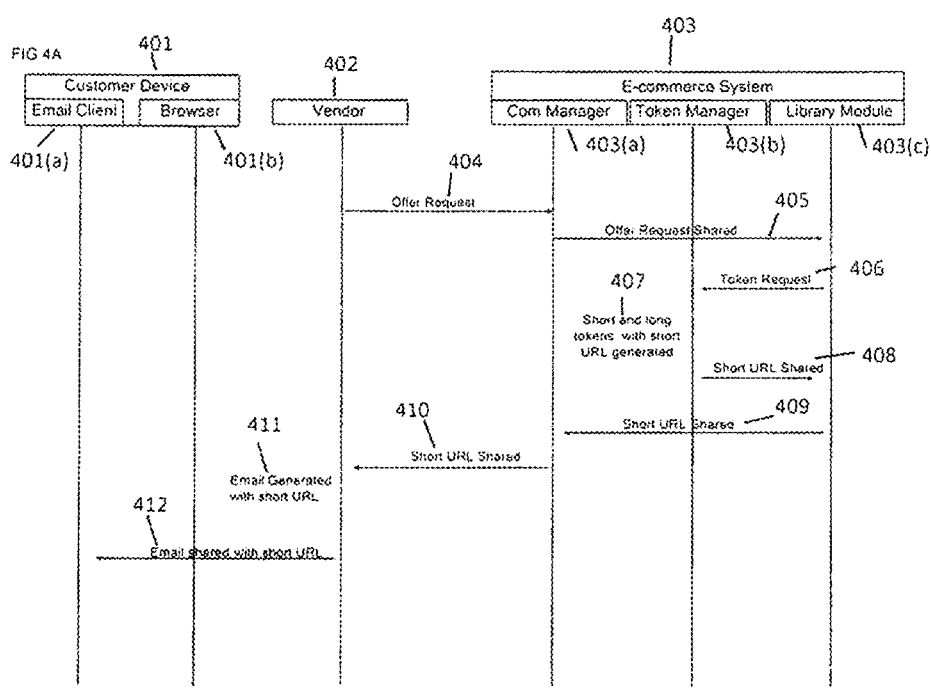

••ooo Verizon 🛜    10:36 AM    ◢ 🔋

❮ Back (1538)    ⌄

From: USA Cable Billing    Hide

To: Patrick Killoran

USA Cable: Email-Based Payment

December 1, 2014 at 10:35 AM

Dear Valued Customer,

Pay your cable bill of $76.56 at https://atpay.it/yq76w ← 415 or make a partial payment at https://atpay.it/dk6re ← 416

FIG. 4B

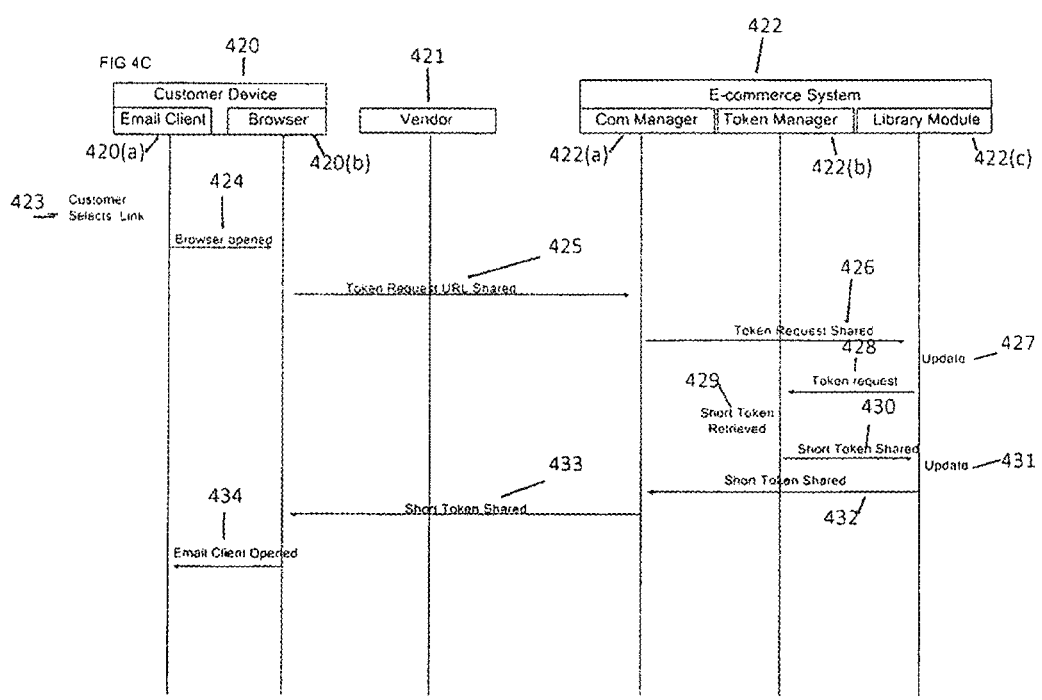

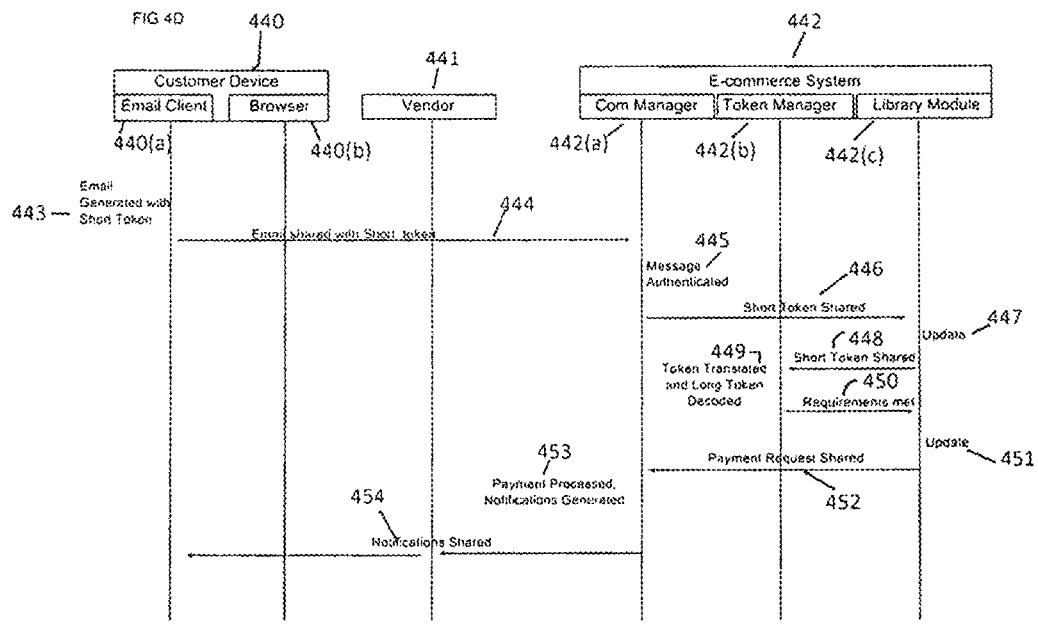

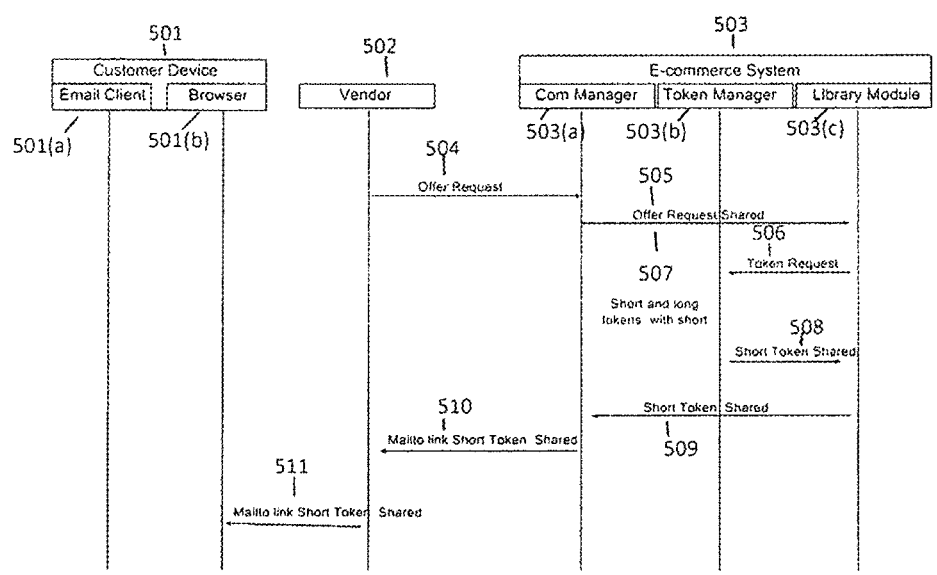

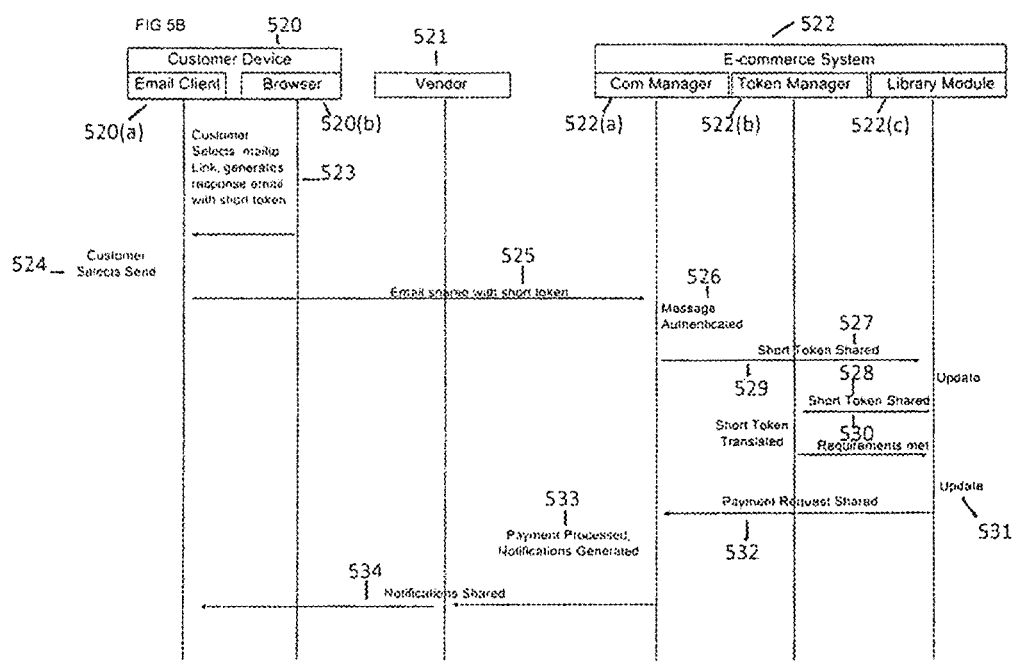

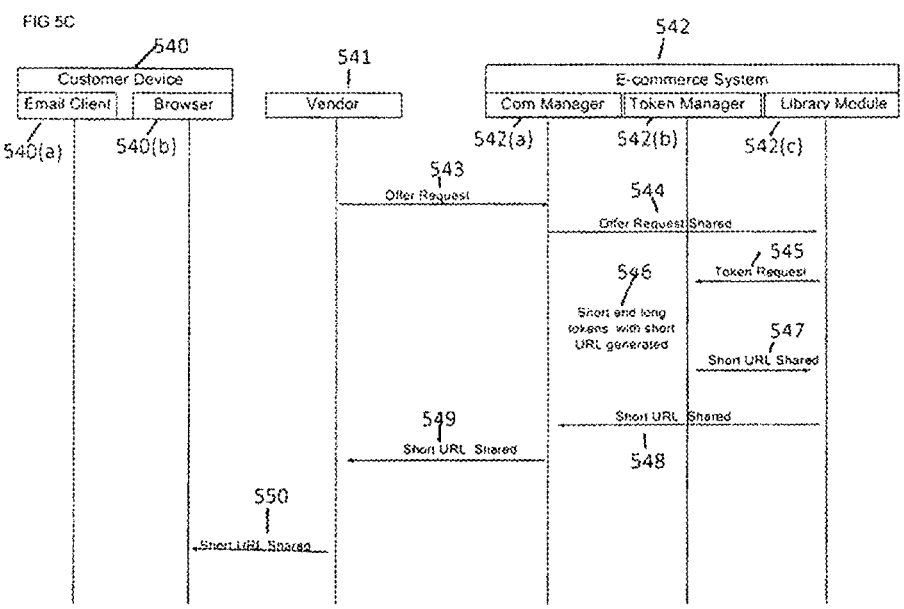

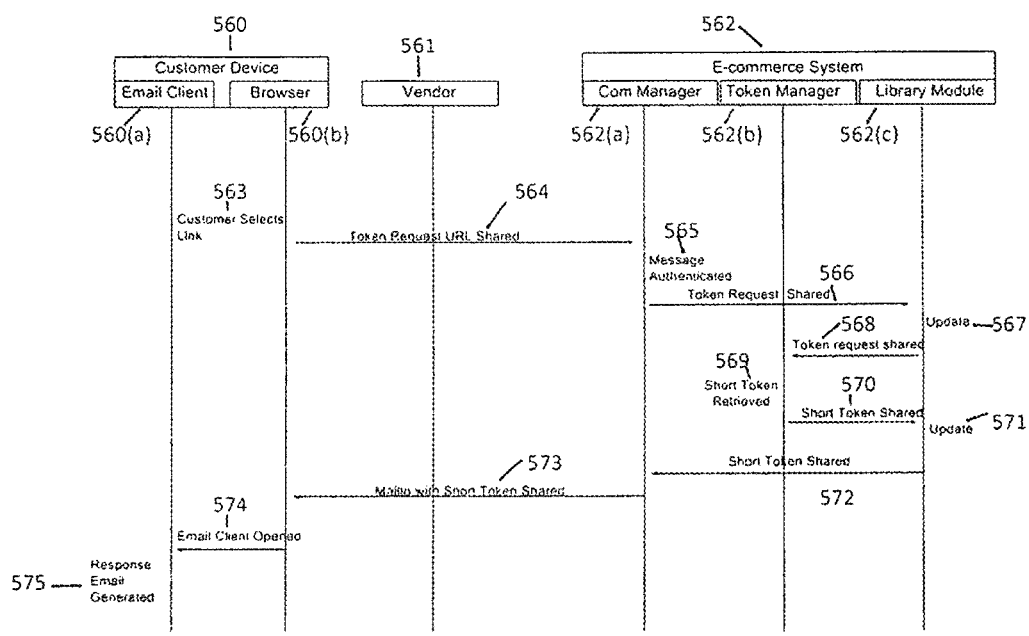

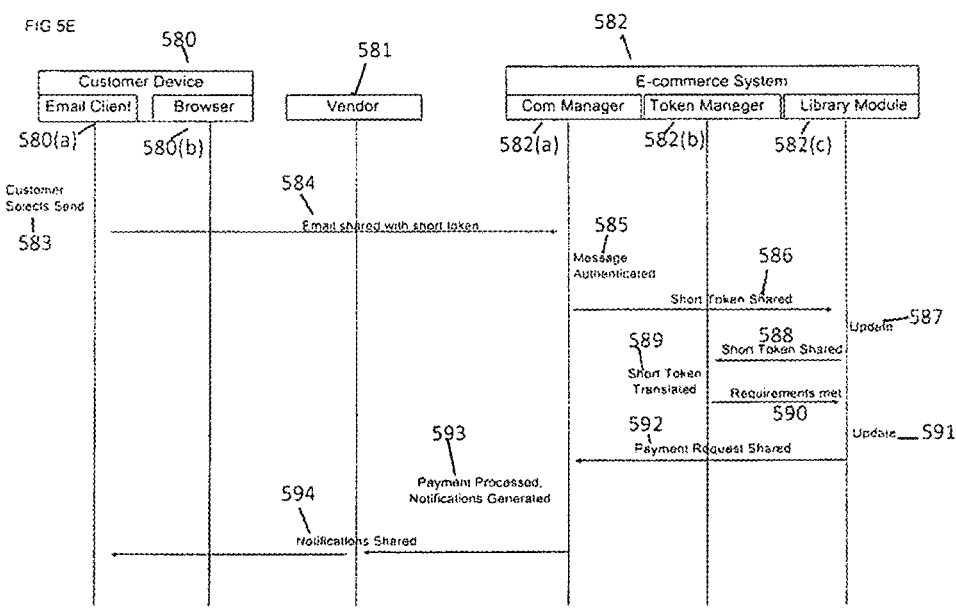

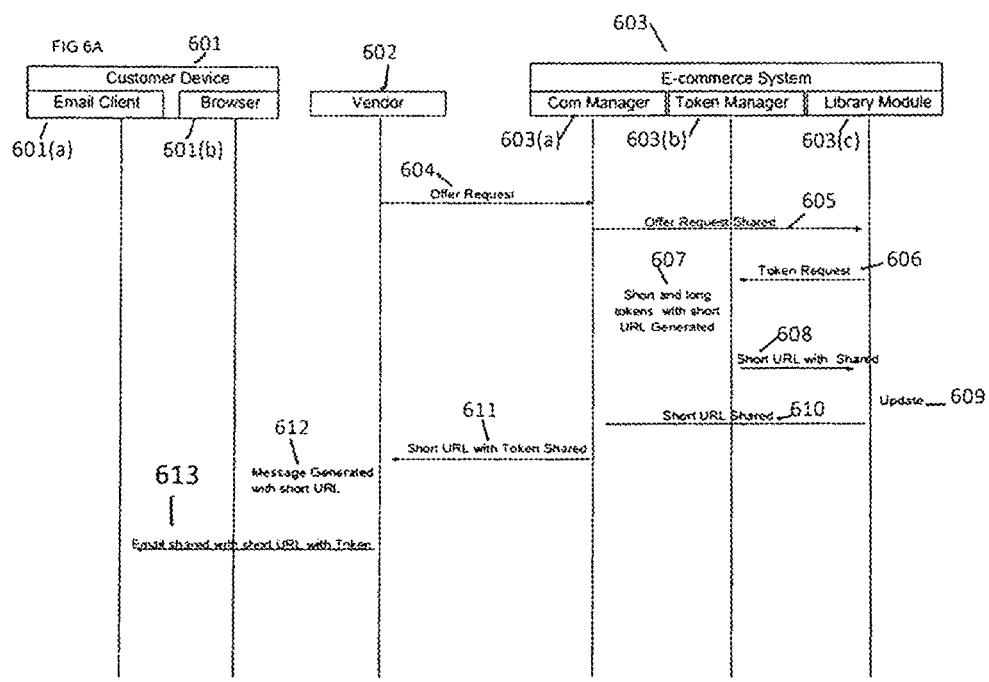

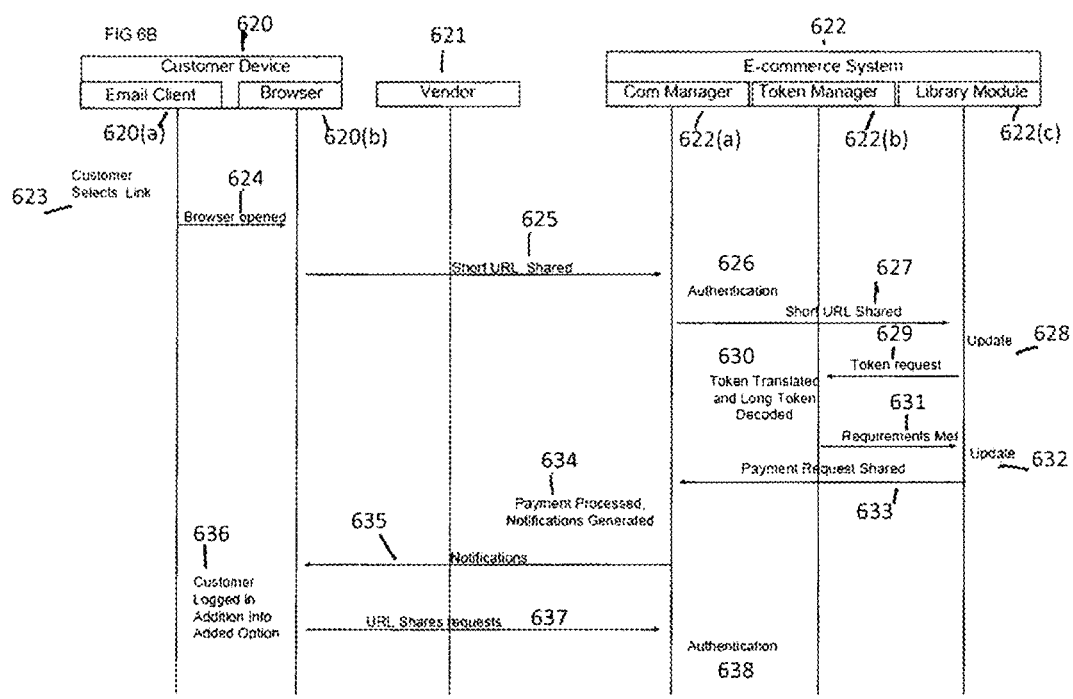

EMAIL ADDRESS TOKEN INTEGRATION

FIELD OF INVENTION

The present invention is related to web-based e-commerce systems. More particularly, the present invention is a system and method that provides email address token integration.

BACKGROUND

Email-based checkouts allow customers to approve a payment by sending an email instead of using a password protected website. This requires the customer to be registered with the e-commerce system and for the email to hold a token. Tokens may be used to identify offers and/or for security. The string of characters that compose the token are often visible to the customer and appear inelegant and confusing. A system that can substitute a shorter token, which can be matched to a longer token, would achieve a clearer and more direct email composition.

Email-Based payment is contingent on customers sending response emails back to the e-commerce system for authentication and decoding. The emails hold tokens and the tokens may be located in the body field. Customers often invalidate the tokens by editing or interfering with the characters that compose the token. Additionally some email clients do not support the body attribute required. An email-based payment system that can locate a token in the 'To', 'CC' or 'BCC' fields would overcome these obstacles.

An e-commerce system is required to store multiple offers for customers. Each offer may have a corresponding long token. Each long token may be identified with another one or more tokens or short Uniform Resource Locator (URL) links. A system that can translate incoming tokens or URL links with the long token and identify the requested offer would provide greater flexibility and clarity for the customer and vendor messaging as well as payment processing and secure web logon.

SUMMARY

A system and method to facilitate transactions between a customer and a vendor is disclosed. The system and method include a receiver to receive an email, wherein the email includes a short lookup token associated with the transaction between a customer and a vendor, and a processor capable of: determining, by the processor, a long token associated with the short lookup token; decoding, by the processor, the long token; performing, by the processor, a validation of the decoded long token; and processing, by the processor, the transaction, on a condition that the validation is approved.

Also disclosed is a system and method including a receiver to receive an email, the email includes a short lookup token which is integrated into the string of characters that compose the email address and is associated with the transaction between a customer and a vendor; and a processor capable of: determining, by the processor, a long token associated with the short lookup token; decoding, by the processor, the long token; performing, by the processor, a validation of the decoded long token; and processing, by the processor, the transaction, on a condition that the validation is approved.

BRIEF DESCRIPTION OF THE DRAWINGS

A more detailed understanding may be had from the following description, given by way of example in conjunction with the accompanying drawings wherein:

FIG. 2A is a diagram illustrating the cycle of tokens within the e-commerce system when tokens are shared and later processed;

FIG. 2B is a transactional flow diagram illustrating the generation of a token in an email address for the use in making email-based payments;

FIG. 2C is an example of the offer email;

FIG. 2D is a transactional flow diagram illustrating the process where an email containing a token as part of the string of an email address is sent, authenticated, parsed, and decoded to complete an email-based payment;

FIG. 2E is an example of a the short lookup token and email address placement within the TO: Field of a response email;

FIG. 3A is a transactional flow diagram illustrating the generation of a short lookup token and long token for the use in making email-based payments;

FIG. 3B is a transactional flow diagram illustrating a process where a short lookup token is authenticated, translated and matched with a long token to complete an email based payment;

FIG. 4A is a transactional flow diagram illustrating the generation of a short lookup token, long token and Short URL link for the use in making email-based payments;

FIG. 4B is an example of an offer email with short URL link;

FIG. 4C is a transaction flow diagram showing the use of a short token with a short URL link;

FIG. 4D is a transactional flow diagram illustrating the process where a short token is returned to the e-commerce system and authenticated for payment processing;

FIG. 5A is a transactional flow diagram of short look up token generation via a web-browser checkout for email-based payments;

FIG. 5B is a transactional flow diagram illustrating where a short look up token is authenticated and matched with a long token to complete an email-based payment on a web-checkout;

FIG. 5C is a transactional flow diagram of short URL link generation with tokens via a web-browser checkout for email-based payments;

FIG. 5D is a transaction flow diagram showing the use of a short look up token with a short URL link in a web browser checkout;

FIG. 5E is a transactional flow diagram illustrating the process where a short look up token is returned to the e-commerce system and authenticated for payment processing in a web checkout; and FIGS. 6 A and B are a transactional flow diagram illustrating the generation of a short lookup token, long token, and a Short URL link for the use in secure a secure web logon and/or web checkout.

DETAILED DESCRIPTION

Figure 1:
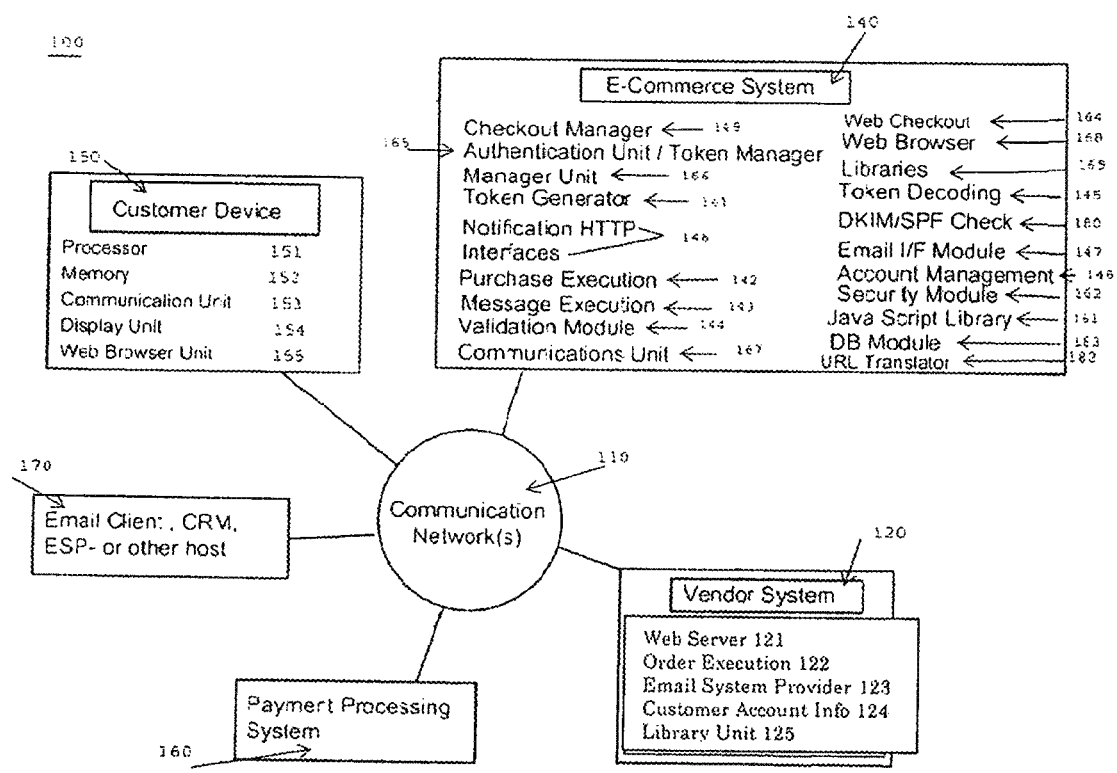
FIG. 1 illustrates a system diagram of an email-based website checkout system.

The embodiments described below may be used in tandem or in relation to specific vendor needs. They may also be integrated with an email service provider (ESP) or directly with a payment processor. Payment processing may occur in a number of ways using multiple gateways, credit cards, debit cards, direct carrier billing and/or an automatic clearing house. Although the description below focuses on the use of email messaging, social media networks may also be substituted. The configuration of the system may vary based on client needs. However, for the purposes of this application FIG. 1 represents one possible configuration.

Many current websites have clunky multi-step checkout processes, which reduce conversions and increase shopping cart abandonment. While there are solutions that allow the functionality those vendors' want, these solutions have been hindered in their adoption rate because of integration difficulties. In previous solutions, the client was burdened with extensive setup that may take days if not weeks.

The methods and apparatus described herein provide a streamlined process of limited clicks. The present web checkout offers a minimum number of clicks thereby providing a feature that many businesses wish to offer to their customers. The described e-commerce system makes acquiring this feature a less burdensome process. It simplifies a complicated set-up process and it takes less time. While online shoppers have come to expect more streamlined checkout experience, integrating those innovations into a businesses' online infrastructure has not proven to be an easy or an accommodating a process.

Currently a vendor needs to generate a unique token on their systems in order to set up a minimum-of-clicks web checkout on their websites for their business. Minimum-of-clicks web checkout has been available through an e-commerce system's API with the use of a "site token"—a value generated by a vendor's server with a private key value known only to them (targeting an e-commerce system's public key), information about the desired transaction amount, and information about the customer's browser that is making the request to purchase. This information is encrypted, and when passed back to an e-commerce system's servers, decrypted using the e-commerce system's private key. After verifying that the browser information in the token matches the browser information the e-commerce system received from the payment request, the e-commerce system executes the transaction. This provides protection from a malicious alteration of the destination of funds by an attacker executing an XSS vulnerability against a vendor site, and protection from a rogue vendor, in that the transaction was executed on the e-commerce system by the request of the paying customer and not the request of the vendor. This existing process demands that a client needed to generate a unique token on their systems in order to set up a minimum-of-clicks service.

Implementing a minimum-of-clicks web checkout has proven to be challenging for some vendors that are unable or unwilling to incorporate the token generator into their systems. This may result from different coding language incompatibilities, system restrictions on external code, limited programming resources, or other internal factors. As a result, an alternative solution is necessary to ease implementation and increase the real availability of this functionality.

The methods and apparatus described herein allow for a secure minimum-of-clicks transaction but for the host business providing the service this entails vastly less setup and integration than in previous versions found in the industry while producing the same result for the customer. This method improves the URL based checkout set-up process found throughout the e-commerce environment. This also improves email based transactions. The industry process typically requires that a client generates a unique token on their systems if they wish to provide their customers a minimum-of-clicks service. As described herein, tokens may be generated on the e-commerce system's servers. The methods and apparatus described herein provide new methods for checking out, donating or paying a bill.

The methods and apparatus described herein may also include a direct-to-purchase process that reduces the delay in purchasing products when shopping online. The use of shopping carts on e-commerce websites requires the customer to make the decision to purchase twice; first when they choose to put the product in the shopping cart and second when they decide to actually pay for the product, services or donations. With direct-to-purchase, the customer only makes the decision once. The customer may choose to buy the product once, and it is purchased and put in the bag. The direct-to-purchase provides a running total of money being spent and provides the option for the customer to "Cancel" individual line items. An image of a shopping bag appears in the corner of the web-page so the customer is provided with the information regarding the content of the shopping bag. When the transaction is submitted for processing may be determined by the merchant. The payment may be submitted at any point in the process or may occur automatically when the customer logs out.

FIG. 1 illustrates a system diagram of an email-based e-commerce system. The e-commerce system may integrate SMS and social media for online e-commerce. It describes the integration of investment portfolio management and bill payment. FIG. 1 shows an example system 100 that may be used for vendor token generation that may be used in e-commerce transactions. The example system 100 includes a customer device 150, a vendor server 120, an e-commerce system 140, a banking server (not shown), a payment processing system 160, and an email service provider 170 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 may utilize short message service (SMS) messages, multimedia messaging service (MMS), social media apps, web browsing, and or email. For example, social media apps may include Facebook, Twitter, GooglePlus+, LinkedIn, Instagram, Pinterest, Swapchat, Tumblr, and the like. The customer device 150 includes a processor 151, memory 152, a communications unit 153, a display unit 154 and web browser unit 155, which may communicate data to/from the web server module(s) in the vendor server 120 and payment server 140. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive an input from a user from an input device (not depicted) that is included in, or connected to, the customer device 150, such as a keyboard, a mouse, a microphone or a touch screen, and provide data that indicates the input to the web browser unit 155.

The vendor system 120 may include a web server 121, order execution unit 122, an email system provider 123, customer account info 124, and a library unit 125. The vendor system may be substituted for a financial management system as illustrated in the examples described herein.

The web server 121 provides a website that may be accessed by a customer device 150. The web server 121 may implement HTTP protocol, and may communicate Hypertext Markup Language (HTML) pages and related data from the website to/from the customer device 150 using HTTP. The vendor server 120 may be connected to one or more private or public networks (such as the Internet), via which the web server 121 communicates with devices such as the customer device 150. The web server 121 may generate one or more web pages, may communicate the web pages to the customer device 150, and may receive responsive information from the customer device 150.

The web server 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The vendor system 120 may also include one or more additional components or modules (not depicted), such as one or more load balancers, firewall devices, routers, switches, and devices that handle power backup and data redundancy.

The order execution unit 122 is configured to receive instructions included in received messages and executes orders on behalf of the vendor system 130.

The memory may be configured to store information associated with e-commerce transactions. This may include inventory information, information used to generate web pages, customer information, and other e-commerce data.

The e-commerce system 140 may include a token generator 141, a purchase execution module 142, a message execution module 143, a validation module 144, a database module 163, a token decoder 145, a notification HTTP module 146, an email interface module 147, an account management unit 148, checkout manager 149, web checkout 164, JAVA script library 161, a security module 162, authentication unit/token manager 165, manager unit 166, communications unit 167, web browser 168, libraries 169, DKIM/SPF check 180, and a Universal Resource Locator (URL) translator 181. While only one vendor system 120 is shown communicating with the e-commerce system 140, this is shown as an example only. The e-commerce system 140 may communicate with an internal or external email service provider (ESP) 170 and an internal or external payment processing system 160. The e-commerce system 140 may communicate with multiple vendor systems 120.

Similarly, vendors may register with the e-commerce system 140. The e-commerce system 140 may provide the vendor system 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor system 130, and/or the email service provider 170.

The token generator 141 may generate tokens for use in e-commerce transactions. Tokens may be encrypted or plain text strings which contain information to perform a transaction when sent to the e-commerce system 140. A token may be one or multiple encrypted strings, files, passwords, cyphers, plain text or other data which may contain information used to perform or authenticate a transaction. While FIG. 1 shows the token generator 141 as being a part of the e-commerce system 140, it may be hosted by any trusted party with access to the private key. For example, the banking server may include a token generator 141. A token may include one or more of the following parameters or other parameters not listed below:

Private-key: The private key provided by the e-commerce system 140.

Public-key: E-commerce system's 140 public key, provided by the e-commerce system 140.

Auth-key: Any additional data that may be used to authenticate the transaction, including, but not limited to, biometric identification, location data and other fraud detection systems.

Partner-id: The partner ID given provided by the e-commerce system 140.

Environment: The environment the vendor wants to generate buttons for. This distinguishes whether the token is being used in a testing environment or in the live environment (and running real transactions).

Type: The type of token to generate (e.g. bulk, email-targeted, etc.). There are multiple types of tokens that a token generator may generate and decode. For example, site tokens may be used for website transactions, email tokens for minimum-of-clicks email payments, and universal tokens for email validations.

Card: The card token associated with the recipient of this token. When a customer is registered with the e-commerce system 140, the vendor receives a credit card token—a unique identifier that references the specific card associated with that customer and vendor. When the vendor is generating a token to submit to e-commerce system 140, they may include the card token as a customer identifier.

Email: The email associated with the receipt of this token.

URL: The Signup URL the recipient may go to if customer doesn't have payment information registered with e-commerce system 140.

Amount: The amount a customer should be charged for the transaction the token is generated for.

User-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.

Expires: Expiration date for token, integer value of seconds since epoch.

Header-user-agent: The HTTP_USER_AGENT from the request header. HTTP headers are sent as part of a request from a customer's web browser unit within customer device 150 for a piece of information. These headers define the parameters that the web browser unit is expecting to get back. The user-agent is the identifier of the software that is submitting the request—typically the identifier of the web browser unit that is requesting the content.

Header-accept-language: The HTTP_ACCEPT_LANGUAGE from the request header. The accept-language is the acceptable language for the response—e.g. the language in which the web browser unit is requesting the content be sent back.

Header-accept-charset: The HTTP_ACCEPT_CHARSET from the request header. The accept-charset is the character sets that are acceptable for the response—e.g. the character set in which the web browser unit is requesting the content be sent back.

IP-address: The IP address of the token recipient.

In one example, a bulk token may omit the card and email fields, thereby allowing for the tokens to be shared. Additionally, or alternatively, a bulk token may include the card field and/or email field but the e-commerce system 140 may be configured to ignore those fields and/or other fields based on the type field.

The purchase execution module 142 facilitates the execution of payments between a customer and a vendor.

The message execution module 143 is configured to analyze received messages and communicate with the token decoder 145 to determine if the received message is valid and to identify the request embedded in the message (e.g. request for purchase of goods.) If the token decoder 145 indicates the token is valid, the message execution module 143 may then access the account management unit 148 to verify a transaction.

The database module 163 serves as a database to store information that may be accessed by the e-commerce system 140.

The token decoder 145 may be configured to decode tokens received from external sources, such as a vendor system 120 or a customer device 150.

The validation module 144 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and FastMail. Any mail from these organizations should carry a DKIM signature.

More specifically, both, signing and verifying modules are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;
c=relaxed/simple; q=dns/txt; l=1234; t=1117574938; x=1118006938;
h=from:to:subject:date:keywords:keywords;
h=MTIzNDU2Nzg5MDEyMzQ1Njc4OTAxMjM0NTY3ODkwMTI=;
b=dzdVyOfAKCdLXdJOc9G2q8LoXSlEniSbav+yuU4zGeeruD00lszZ VoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version, a is the signing algorithm, c is the canonicalization algorithm(s) for header and body, q is the default query method, l is the length of the canonicalized part of the body that has been signed, t is the signature timestamp, x is it's expire time, and h is the list of signed header fields, repeated for fields that occur multiple times.

The DKIM-Signature header field itself is always implicitly included in h.

The data returned from the verifier query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, validation module 144 may perform any authentication and validation type protocols. DKIM and SPF are used to provide examples of such validation protocols that may be performed in validation module 144.

The notification HTTP module 146 delivers notices of events to external systems, such as an HTTP endpoint the vendor configures to update their internal database when a transaction is executed.

An email interface module 147 may be configured to parse emails for action by the e-commerce system 140.

The account management unit 148 is configured to manage accounts registered with the e-commerce system 140. A customer or vendor, wishing to complete a transaction with an e-commerce system 140 may register his/her email address and payment information with the e-commerce system 140. The account management unit 148 may be configured to store a customer registry and a vendor registry.

The security module 162 may be configured to perform additional security measures to prevent unauthorized access to the system or fraud.

The email service provider 170 may be associated with the vendor system 120, the e-commerce system 140, or may be a third party entity. The email service provider 170 may be configured to provide email marketing services. The email service provider 170 may further be configured to provide tracking information showing the status of email sent to each member of an address list. The email service provider 170 may further be configured to segment an address list into different interest groups or categories to send targeted information. The email service provider 170 may also parse messages based on the secondary system of email-targeted tokens. The email service provider 170 may also be configured to send trigger emails based on responses from the vendor system 120 or customer behavior. The email service provider 170 may further be configured to create or use templates generated by the e-commerce system 140. The templates may be used for sending information to contacts.

Email service provider 170 may include a customer interface that allows a customer to adjust the template or it may be integrated with external sources (e.g. vendor system 120 or e-commerce system 140). The email service provider 170 may comprise a send engine (not shown), which allows vendors to distribute their message that may be received by one or more customer device(s) 150. The email service provider 170 may further include a tool for generating mailto links, graphic buttons, and tokens. The email service provider 170 may be configured to dynamically customize the content of emails that are sent out, to tailor personalized information and mailto links.

The banking server (not shown) may be controlled by a third party system bank. The e-commerce system 140 may communicate with the banking server to verify that the customer has adequate funds or credit for the requested payment. For example, the banking server may be a controlled by VISA, AMERICAN EXPRESS, MASTERCARD or any other banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

The email-based e-commerce system 140 may allow vendors to send advertising emails or bills with a mailto link associated with a specific product offer (or payment amount) and select the mailto link and generate a response email by selecting the mailto link. This response email contains a token and is addressed to the e-commerce system 140. Once sent, this response email confirms the customer's payment for the product (or prepayment of a bill) by parsing the information in the token. The e-commerce system 140 processes the payment and notifies the vendor system 120 and the customer device 150. The e-commerce system 140 may comprise a token generator 141 as well as components for processing the tokens and components for processing the payments and a system for notifying the vendor system 120 of the transaction details.

The functionality of the offer, mailto link, and response email is described in U.S. Pat. No. 9,152,980 which issued on Oct. 6, 2015 entitled EMAIL-BASED E-COMMERCE, which is a continuation of U.S. Pat. No. 8,775,623 which issued on Jul. 8, 2014 entitled SYSTEM AND METHOD FOR EMAIL-BASED E-COMMERCE, and U.S. Pat. No. 9,058,591 which issued on Jun. 16, 2015 entitled EMAIL-BASED DONATIONS, which applications are incorporated by reference as if fully set forth.

Referring back to the example system in FIG. 1, the payment processing system 160 may be an independent third party operated unit, it may be located in the e-commerce system 140 or the vendor system 120.

While the example system shown in FIG. 1 shows the e-commerce system 140 comprising the token generator 141, this is shown as an example only. The vendor system 120 may also include a token generator that allows vendors to directly create tokens. In another example, a third party may have a token generator to create tokens for use by the vendor system 120.

System 100 may not require the vendor system 120 to host the token generator 141 on their system. System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein. The mailto link may be accessed with a corresponding short URL.

The e-commerce system 140 may include a database of registered customers, such as for payment processing. The e-commerce system 140 may identify a customer by their email address and may decode tokens included in the content of an email and process payments based on the data in the token. A vendor that is associated with the e-commerce system 140 may send emails with the tokens generated for processing by the e-commerce system 140. When generating tokens, a related URL checkout page with a matching offer is generated. This allows vendors via vendor system 120 to send emails with payment options, including payments for product offers, donations, services and gift cards, for example, with each offer associated with a token and a URL checkout page. The token is associated with a mailto link. A customer may activate the mailto link by selecting (or "clicking on") the link and send the message to the e-commerce system 140. The e-commerce system 140 may then identify the email address and decode the token. If the e-commerce system 140 determines that the email address is not registered in the database, the e-commerce system 140 sends an email back to the customer with a URL link that is a checkout. This checkout is prepopulated based on the customer's mailto link selection based on the content of the token. The URL captures the payment information and registry information. The e-commerce system 140 updates the database once the new customer is registered. In future transactions, the email address of the customer is identified as registered by the e-commerce system 140 and the payment is processed exclusively through an email payment gateway.

An email-based e-commerce system 100, as described herein, allows an email payment opportunity. This may include an email advertisement offering a product or service which is sent to customers and contains one or more mailto links. Each mailto link may relate to an item (e.g. service or product). If the mailto link is selected by a customer, an email message associated with an item or items is generated. Within that generated email message is a token that includes encoded information such as the purchase amount, the merchant, or an item identifier. The information contained in the token includes details for both the completion of email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g. a response email in the case of product unavailability). This mailto link may be generated by a vendor through a web interface tool, or by using the e-commerce system 100 to programmatically create either the token or the full mailto link.

For a customer to complete an email transaction, the customer's payment information may be contained in the email e-commerce system database 163. In order to determine if the customer's payment information is in database 163 the token may be decoded to recognize the customer when the email arrives at the e-commerce system 140. The vendor sends the first email via the vendor system 120. The customer via customer device 150 responds by activating a mailto link by sending the response to the e-commerce system 140. If the customer is registered and the incoming email is authenticated, when the token is decoded, the transaction is processed.

If the customer is not registered, a web checkout page may be needed. Additional information may be encoded within the email token that describes a web checkout page for the email offer. The vendor's email may thereby serve multiple purposes. One enables the email to perform as an email payment, if the customer is registered, and another enables the unregistered customer to be sent a web checkout 164. The web checkout 164 may be prepopulated with additional information based on the customers' original selection that is decoded from the token. The additional information included within the token identifies remote resources, which may include an input display and validation components. The remote resource may function as a plugin, as a reference to information stored in a database, or as a hook into the execution of an independent function.

When the web checkout 164 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the e-commerce system 140. If the validation resource returns a "fail" condition for any data on the form, error messaging may be displayed to the customer, to enable correction of the one or more particular inputs that were identified as incorrect and resubmission again.

These remote resources may be created to describe standard information that may be used across numerous merchants, or they may be used to define custom information that may be used for a single merchant.

Using this system 100, a vendor via vender system 120 may not be required to expend additional computer programming effort because it relies on the email e-commerce system 140. If the offer web page is linked to the email purchase opportunity, the vendor may not be required to modify any existing systems or processes to register customers with the email e-commerce system 140. The vendor may not need to segment their email lists into registered and unregistered customers and the customers are not aware of the distinction within the content of the email. The distinction between customers occurs by virtue of the system relieving both the vendor and the customer of any excess choices or distinctions. The vendor may create offers manually via a web interface, and the email e-commerce system 140 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows separate from their email e-commerce solution, or the vendor may use the email e-commerce system as a full-featured payment system for both web and email transactions without doing any software development. Presenting the customer with a clear process that seamlessly migrates the customer to adopt an email-based checkout process eases the customer into a new technology where transactions happen by email instead of on a URL. This system 100 provides a vendor with a more automated or customized way of handling elements that may be achieved through the use of the email e-commerce system 140.

Figure 1A:
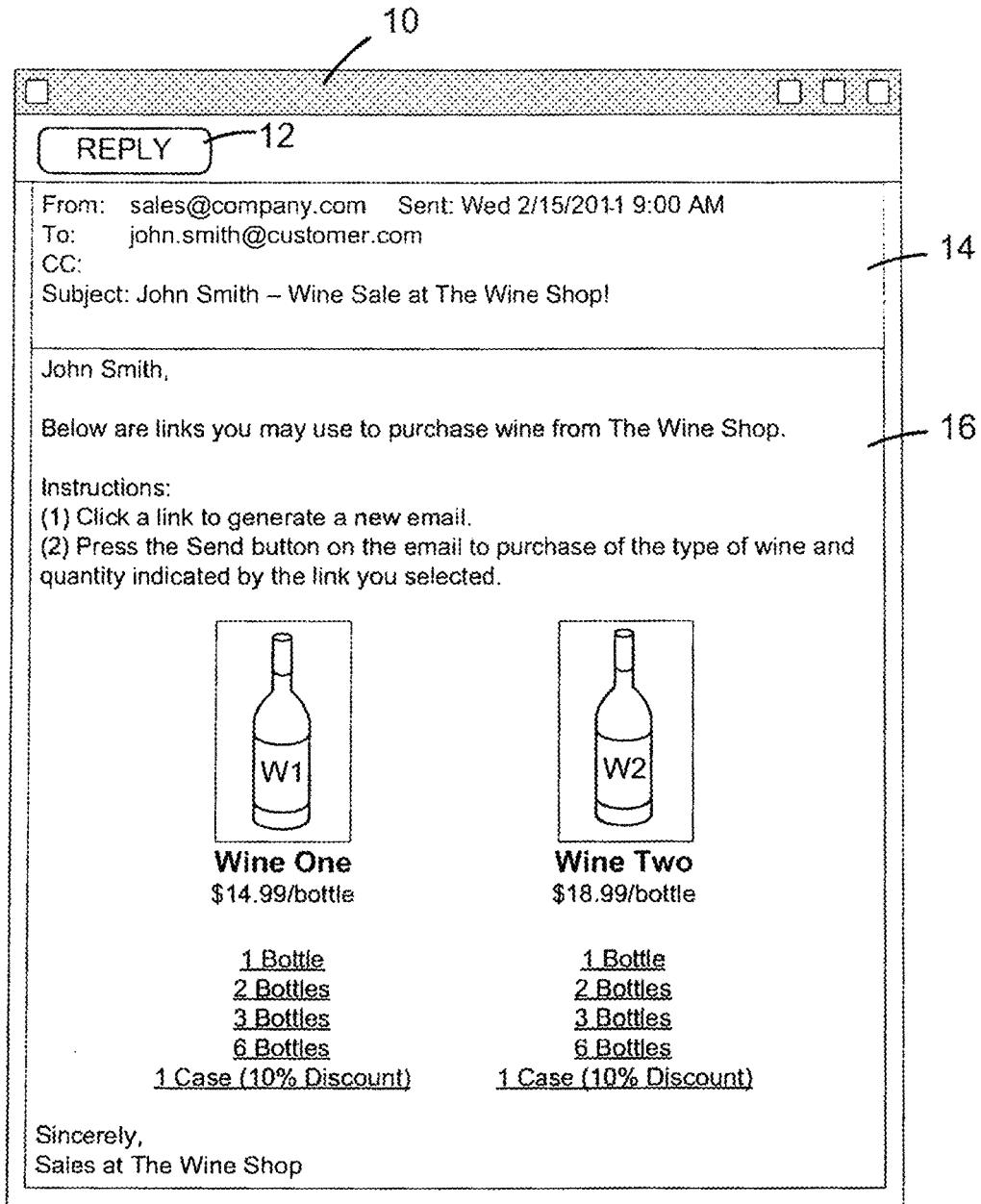
FIG. 1A illustrates an example advertisement email message that solicits the purchase of goods from a vendor system.

FIG. 1A illustrates an example email message that solicits the purchase of goods from a vendor. FIG. 1A shows an email display window 10 that may be used by the email client module of customer device 140 to display a first example email message from the message processing module. The email display window 10 may include a reply button 12, a control area 14, and a message body area 16. The control area 14 may display control and/or header information associated with the email message, such as the email addresses of the sender and recipient of the message. According to this example, the control area 14 shows that the sender of the message has the email address "sales@company.com." This is an email address that may be associated with an account used by the e-commerce system 120 for the communication of email messages. Further to this example, the control area 14 shows that the email address of the example recipient of the message (John Smith) is "john.smith@customer.com." The control area 14 may also display information such as a subject of the email message and the time the email message was sent. The reply button 12 may respond to user input to generate a new display element (not depicted) to respond to the email message.

The message body area 16 may display the body of the email message. As shown in FIG. 1A, the message body area 16 may display an example email message that shows information related to two example products (Wine One and Wine Two) that are being offered for sale by an example vendor (The Wine Shop). The message body area 16 includes a picture of a bottle of each type of wine, as well as the price for a bottle of each type of wine. The message body area 16 also includes, under the picture of the bottle of Wine One, a number of mailto links, such as the "1 Bottle," "2 Bottles," "3 Bottles", "6 Bottles," and "1 Case (10 percent Discount)" links. The message body area 16 also includes similar links under the picture of the bottle of Wine Two. These links may be defined according to the mailto URI scheme or other appropriate format, and each may describe a new email message that may be generated by the email client module of customer device 140 when that link is selected.

The "1 Bottle" link beneath the picture of the Wine One bottle may include information that, if selected, generates an email message that, if received by the e-commerce system 120, will indicate to the e-commerce system 120 that John Smith may like to purchase one bottle of Wine One. As a further example, Wine One may have a product identifier of "0005," and John Smith may have a customer identifier of "0777." According to this example, the "1 Bottle" link may describe an email message that is addressed to an email account that is associated with the e-commerce system 120, and that includes a message body that includes the identifier for John Smith ("0777"), an identifier of the selected product ("0005"), and an identifier of the quantity that John Smith may like to order (in this example, a single bottle). Alternatively or additionally, the email message described by the link may include information such as text that describes the order, an identifier of the vendor (in this example, The Wine Shop), an email campaign identifier, and/or other information. Similarly, the "2 Bottles" link beneath the picture of the Wine One bottle may include information that describes an email message that, if received by the e-commerce system 120, will indicate to the e-commerce system 120 that John Smith may like to purchase two bottles of Wine One. According to this example, the "2 Bottles" link may be defined as follows:

<a href="mailto:sales@company.com?subject=Purchase percent 20from percent 20Wine percent 20Shop percent 20 and body=You percent 20have percent 20created percent 20an percent 20order percent 20for percent 20two percent 20bottles percent 20of percent 20Wine percent 20One. percent 20Press percent 20the percent 20Send percent 20button percent 20to percent 20complete percent 20the percent 20order. percent 0A percent 0AProductID0005 percent 20QualifierNA percent 20Qty0002 percent 20CustomerID0777 percent 20CampaignID0003" target="_blank">2 Bottles</a> mailto:sales@company.com?Subject="Press send to pay $42.99 to Wine Shop"? body="TEXT XXX-XXX-XXX-XXX"

In addition, the token identifier may be part of the To: address, or any other portion of an address field, or the address field itself. This token may be, for example, of the form: ex: mailto:payment-id-XXX-XXX-XXX@payments.atpay.com?Subject="Press send to pay $42.99 to Wine Shop"?body="TEXT". Once this token identifier reaches the e-commerce system 120, the e-commerce system 120 may perform a look-up of the actual token in order to parse the offer details. This process is described in greater detail below.

Similarly, the "3 Bottles," "6 Bottles," and "1 Case (10 percent Discount)" links beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10 percent Discount)" links under the Wine Two bottle indicate corresponding information for Wine Two as that described above with respect to the mailto links relating to Wine One.

The email client module of customer device 140 may receive a user input that indicates that one of the links displayed in the message body area 16 is selected. The user input may be, for example, a mouse click, keyboard input, or any other type of input that indicates that a link is selected. The email client module of customer device 140 may, in response to this user input, generate and display an order email message as specified by the selected link.

Figure 1B:
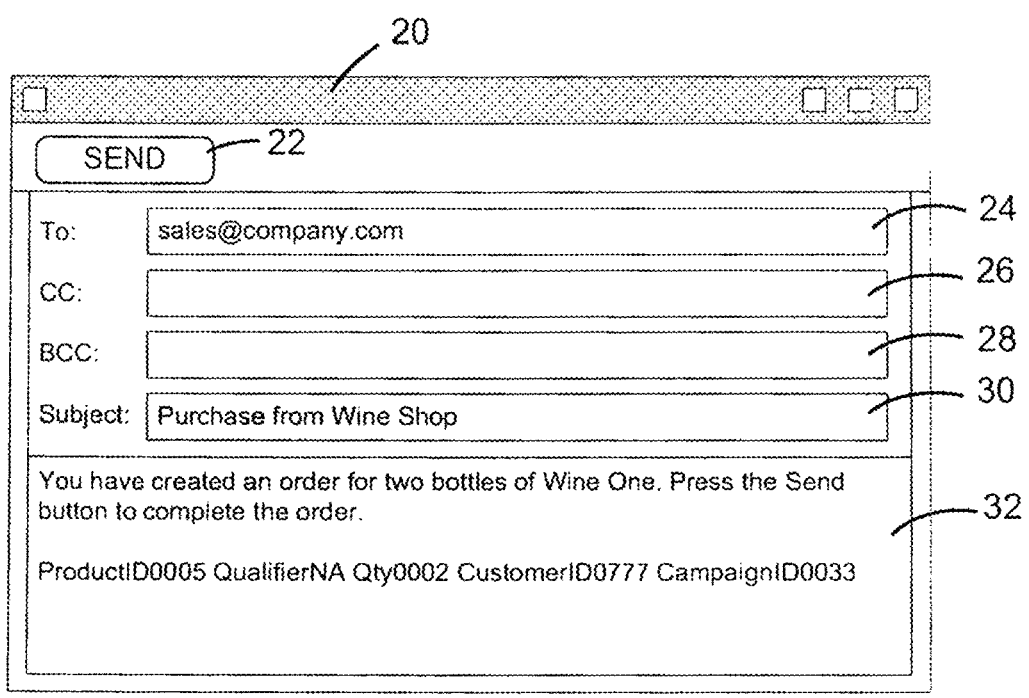
FIG. 1B illustrates a response email message for placing an order.

FIG. 1B illustrates an email message for placing an order. FIG. 1B shows an example message composition window 20 that may be displayed in response to a selection of a link from the message body area 16 of the email display window 10 of FIG. 1A. The message composition window 20 of FIG. 1B may include a Send button 22, a To area 24, a CC area 26, a BCC area 28, a Subject area 30, and a message body area 32. The Send button 22 in the message composition window 20 of FIG. 1B may be responsive to input from a user such as a mouse click, keyboard input, or any other type of input. The different areas 24, 26, 28, 30, 32 in the message composition window 20 display different portions of an email message. For example, the To area 24 includes text that indicates email addresses to which the email message is addressed, while the message body area 32 displays the contents of the body of the email message. Each or any of these different areas 24, 26, 28, 30, 32 may be editable based on user input. Changes to the contents of these areas 24, 26, 28, 30, 32 may change the corresponding portion of the email message.

FIG. 1B shows an example wherein the "2 Bottles" link beneath the picture of the Wine One and described above with reference to FIG. 1A is selected. The To area 24 indicates that the message is addressed to sales@ company.com. The Subject area 30 indicates that the subject of the message is "Purchase from Wine Shop." The CC area 26 and BCC area 28 are blank. Continuing the example of FIG. 1B, Wine One product has a product identifier of "0005" and John Smith has a customer identifier of "0777." Accordingly, the message body area 32 includes the text "ProductID0005" and "CustomerID0777." To indicate that the user has selected the purchase of two bottles, the message body area 32 includes the text "Qty0002." Further, the message body area 32 includes the text "CampaignID0033," indicating that the order is associated with an email campaign with an identifier of "0033."

In an instance where a different link from the message body area 16 of FIG. 1A is selected, the display areas 24, 26, 28, 30, 32 in the message composition window 20 may include contents specified by the selected different link. For example, in an instance where a link related to Wine Two is selected, the message body area may not include the text "ProductID0005," but may include text that indicates the corresponding identifier for Wine Two.

Figure 1C:
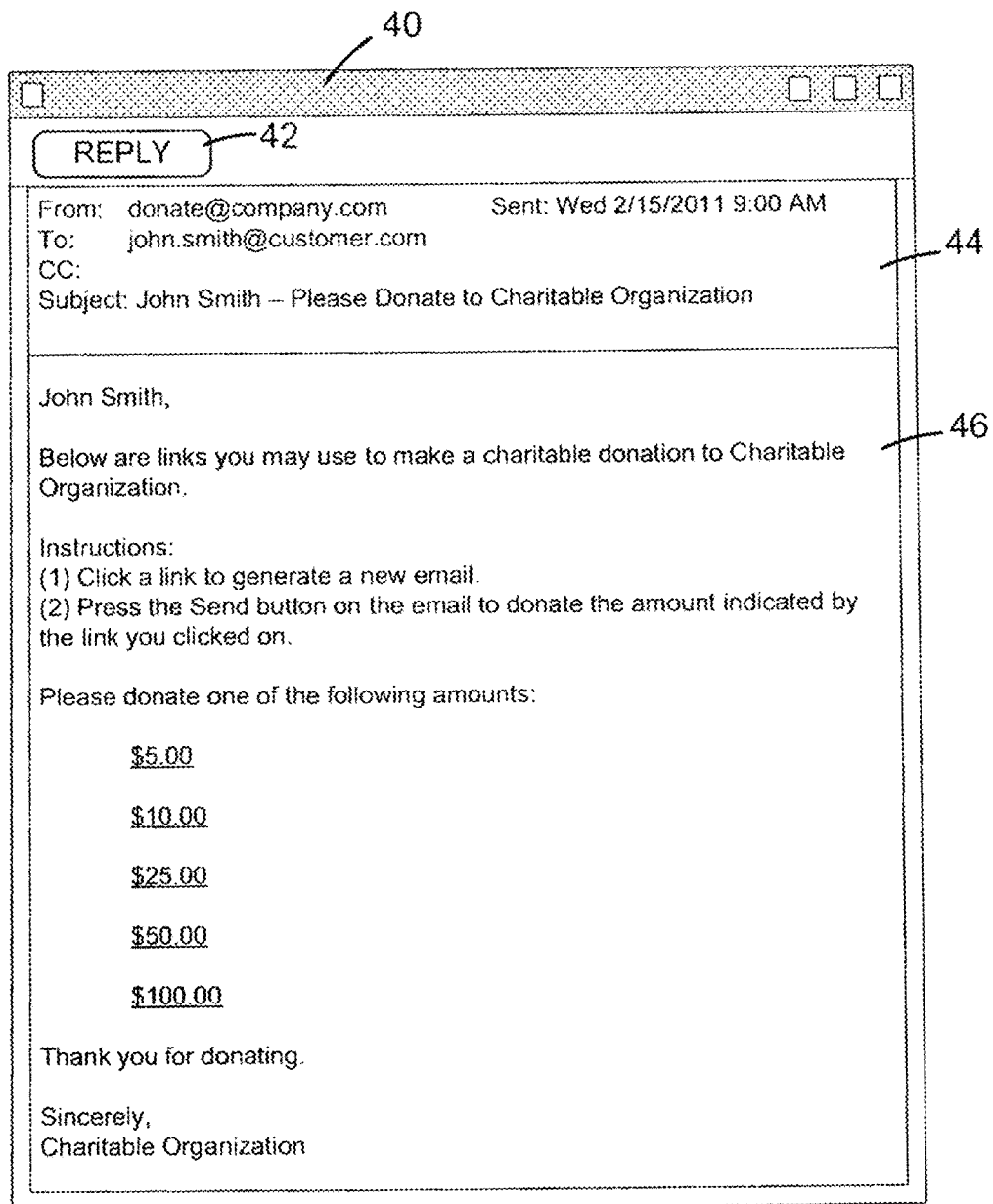
FIG. 1C illustrates an advertisement email message that solicits a donation.

FIG. 1C illustrates an advertisement email message that solicits a donation. FIG. 1C shows an email display window 40 that may be used by the email client module of customer device 140 to display a second example email message from the message processing module. The email display window 40 includes a Reply button 42, a control area 44, and a message body area 46. These display areas 42, 44, 46 may possess similar and/or analogous characteristics and/or perform similar functionality as corresponding display areas 12, 14, 16 in the message composition window 20 of FIG. 1A. According to the example of FIG. 1C, the control area 44 shows that the sender of the message has the email address "donate@company.com." This is an email address that may be associated with an account used by the e-commerce system 120 for the communication of email messages. Further to this example, the control area 44 shows that the email address of the example recipient of the message (John Smith) is "john.smith@customer.com."

As shown in FIG. 1C, the message body area 46 of the email display window 40 may display an example email message that shows information related the solicitation of donations for an example non-profit organization ("Charitable Organization"). The message body area 46 also includes mailto links, such as the "$5.00," "$10.00," "$25.00," "$50.00," and "$100.00" links. These links may possess similar and/or analogous characteristics, and/or include similar and/or analogous information, as the mailto links described above with reference to FIG. 1A. The "$5.00" link describes an email message that, if received by the e-commerce system 120, will indicate to the e-commerce system 120 that John Smith may like to donate $5.00 to Charitable Organization. Similarly, the "$10.00," "$25.00," "$50.00, and $100.00" links describe email messages with corresponding information for $10.00, $25.00, $50.00, and $100.00 donations, respectively.

The email client module of customer device 140 may receive a user input that indicates that one of the links displayed in the message body area 46 is selected. The email client module of customer device 140 may, in response to this user input, generate and display an order email message as specified by the selected link.

Figure 1D:
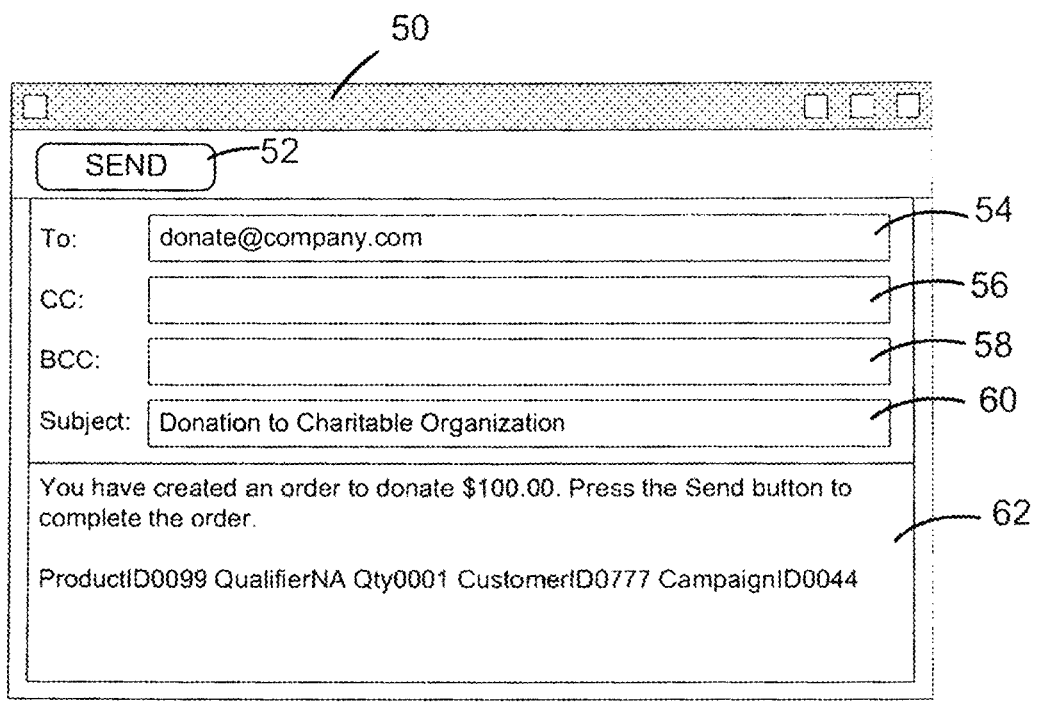
FIG. 1D illustrates a response email message for ordering a donation.

FIG. 1D illustrates an email message for ordering a donation. FIG. 1D shows an example message composition window 50 that may be displayed in response to a selection of a link from the message body area 46 of the email display window 40 of FIG. 1B. The message composition window 50 of FIG. 1D may include a Send button 52, a To area 54, a CC area 56, a BCC area 58, a Subject area 60, and a message body area 62. These display elements 52, 54, 56, 58, 60, 62 may possess similar and/or analogous characteristics and/or perform similar functionality as corresponding display areas 22, 24, 26, 28, 30, 32 in the message composition window 20 of FIG. 1B.

FIG. 1D shows an example wherein the "$100.00" link from the message body area 46 of the email display window 40 of FIG. 1C is selected. The To area 54 indicates that the message is addressed to donate@company.com. The Subject area 60 indicates that the subject of the message is "Donation to Charitable Organization." The CC area 56 and BCC area 58 are blank. According to this example, a donation of $100.00 to Charitable Organization has a product identifier of "0099," and John Smith has a customer identifier of "0777." Accordingly, the message body area 62 includes the text "ProductID0099" and "CustomerID0777." Further, the message body area 62 includes the text "CampaignID0044," indicating that the order is associated with an email campaign with an identifier of "0044."

The email client module of customer device 140 may send the generated order email message to the e-commerce system 120. This may be performed in response to input from a user of the customer device 140. As one example, the email client module of customer device 140 may, in response to a selection of the Send button 52 in the message composition window 50 of FIG. 1D, transmit an order email message based on the contents of the fields 54, 56, 58, 60, 62 in the message composition window 50. As another example, the email client module of customer device 140 may, in response to a selection of the Send button 52 in the message composition window 50 of FIG. 1D, transmit an order email message based on the contents of the display areas 54, 56, 58, 60, 62 in the message composition window 50.

As initially presented above, a token may be located within the To: Cc: or Bcc fields of a response email. This token may take the form of a short token, for example. The e-commerce system 120 may generate the short token that is located in the To: field, or any other field, for example, as part of the email address. When the vendor system 130 requests that the token generator 180 generate a mailto link with the identifiers and token, the token generator 180 may generate a "short lookup token" and the "long token" encoded with the identifiers. The short lookup token may be associated with the long token and may be required or otherwise needed to access the information in the long token index. The short token index may be sent in an email to the customer device 140 as a mailto link. The customer using the customer device 140 selects the mailto link and generates the response email addressed to the e-commerce system 120. The short lookup token may be built into the address of the response email. The short lookup token may be of the form:
    payment-id-74E4DE00-51E2-457B-8C0B-
       648640EF232D@payments.atpay.com,
for example.

When the customer using customer device 140 sends the email and the e-commerce system 120 receives the email and authenticates the customer's email address, the e-commerce system 120 may also determine using the short lookup token included in email address of the e-commerce system 120 the long token associated therewith. When the long token is determined, the e-commerce system 120 decodes the long token and processes the payment. The use of the short token allows for a less convoluted field in the email address and eliminates the need for the token to be located in the body field.

The short token lookup is not necessarily required in this system, as the transactions may be processed with the long token either in the address field, another field, or in the body of the response email. The use of the short lookup token may lessen the one-to-one correlation between the token and the actual offer and/or transaction details, as that correlation may be more direct in the long token embodiment.

FIG. 2A is a diagram illustrating the cycle of tokens within the e-commerce system when tokens are shared and later processed. The e-commerce system generates long tokens that correspond to offers. The long tokens may have a corresponding short lookup token and short URL link. Vendors and customers may share 201 short URL links and short lookup tokens with the e-commerce system. The e-commerce system authenticates 202 and parses 203 the messages and Short URL links into long tokens 204 and short tokens 205. The e-commerce system translates short tokens to long tokens 208. The e-commerce system generates long and short tokens 209. The short URL link 210 and short tokens 211 are shared with vendors and customers. Long tokens are decoded 206 and the payment is processed 207 on a condition that the criteria is met.

As initially described above, a token may be located within any of the fields of a response email. Disclosed is a system and method where a token may be contained in the "To:," "CC:," or "BCC:" fields of the response message. This provides greater flexibility for the e-commerce system and eliminates the need for including the string of characters in the body field. This method also avoids other complications, for example, where the email clients disrupt the token in the body of the email. In this method the token is a part of the string of characters that define the email address of the e-commerce system. The e-commerce system parses the incoming address and distinguishes the characters relating to the payment information and destination.

FIG. 2B is a transactional flow diagram illustrating the generation of a token in an email address for the use in making email-based payments. The vendor 221 requests an offer 223 from the e-commerce system's communication manager 222(*a*). The communication manager 222(*a*), in association with the library module 222(*c*), determines a token integrated in an email address is required and shares 224/225 a token request with the token manager 222(*b*). The token manager 222(*b*) generates a short lookup token and a corresponding long token 226 that is associated with the vendor's offer. The token manager 222(*b*) integrates the short lookup token into an email address used by the e-commerce system. For example: payment-id-1C84265F-3814-4F2E-894F-7A708C6FF873@payments.atpay.com The token manager 222(*b*) shares the short lookup token 227 with the library module 222(*c*). The library module 222(*c*) shares the short lookup token 228 with the communication manager 222(*a*). The communication manager 222 (*a*) shares the short lookup token 229 with the vendor system 221. The short lookup token, integrated with the email address, is included in a mailto link addressed to the e-commerce system. For example:

mailto:payment-id-5F4736E2-4C09-4CB9-9D88-7CC-165785E09@payments.atpay.com?subject=Press%20-send%20to%20pay%20$76.56%20to%20USA%20C-able%20&body=USA%20Cable%20makes%20it%2-0easy%20to%20pay.%20Simply%20press%20%22se-nd%22%20to%20confirm%20your%20payment%20-of%20$76.56.%20If%20we%20need%20more%20info,%20we%20will%20let%20you%20know.%20Thank-s!%0A%0APowered%20by%20@Pay%0A In this example, the short lookup token, integrated in the email address used in a mailto link, is a function in the vendor's system, but this may also be a function of the e-commerce system. The vendor 221 may request tokens via a web interface or a direct integration with the API. The vendor 221 generates an email offer message addressed to the customer's email account with a message containing the mailto link with short lookup token 230 integrated in the email address. The vendor 221 shares the email offer message with the short lookup token 231 integrated in the email address with the customer email client 220(*a*) on the customer device 220.

FIG. 2C is an example of the offer email. The short lookup token integrated in the email address may be embedded in a mailto link. The mailto link and token may be embedded behind a graphic image such as a button 230. There may be more than one offer contained in the email offer message. (In this example there is only one offer 230.) Each offer is associated with a mailto link containing a token. Alternatively, the offer message may come from the e-commerce system or a third party. Alternatively the vendor may use other methods to share the mailto link with token.

FIG. 2D is a transactional flow diagram illustrating the process where an email containing a token, as part of the string of an email address, is sent, authenticated, parsed, and decoded to complete an email-based payment. The customer using the customer device's email client 240(*a*) views the email offer message and selects the mailto link containing the short lookup token integrated in the email address. This automatically generates a response email 243 addressed to the e-commerce system which holds the short lookup token as a part of the string of characters that define the email address of the e-commerce system. For example:
Payment-id-1C84265F-3814-4F2E-894F-7A708C6FF873@payments.atpay.com FIG. 2E is an example of the short lookup token and email address placement within the TO: Field 260 of a response email. The email address, with token, in this example is in the TO: field, but could be in any field that facilitates a delivery to an email destination, for example, the "BCC" or "CC fields," or in any field where the token could be accessed by the e-commerce system. Referring back to FIG. 2D, the email client 240(*a*) shares the response email 244 containing the token integrated in an email address with the e-commerce system's communication manager 242(*a*). The communication manager 242(*a*) authenticates the response email 245. If the response email fails authentication 245, the e-commerce system 242 may send a confirmation message to the customer 240 with a URL link that drives the customer to a signup web page to complete the transaction. If the response email passes authentication 245, the communication manager 242(*a*) shares the short lookup token integrated in the email address 246 with the library module 242(*c*). The library module 242(*c*), in association with the communication module 242(*a*), determines that a translation is required and shares the short lookup token integrated in the email address 247 with the token manager 242(*b*). The token manager 242(*b*) parses the short lookup token integrated in the email address identifying the characters referencing the short lookup token. The short look up token is decoded and translated 248 by the token manager 242(*b*) and matched with the long token. The long token may be of the form:

@sLTGmvk+cR9cU6nwZPYzO77DMbvYvYfPAAAA-
AAAAAAUbQD+QQCEFvD/CyExEi8rOjrFyEz LOI-
zbaFeKV43XvEbnTJe1AUHBGcSTJzunn+5b1rXF-
uLBcR0zUH8Ej6oGLcNyTNTA6c47CjcGU2C2i The long token is also decoded 248. The token manager 242(*b*), in association with the library module 242(*c*), determines the translation is complete and that the requirements are met 249. The library module 242(*c*) is updated 250. If requirements are not met, the e-commerce system 242 may send a confirmation message to the customer 240 with a URL link that drives the customer to a signup web page to complete the transaction. If the requirements are met and the library module 242(*c*) is updated, a payment request is shared 251 with the communication manager 242(*a*). The communication manager 242(*a*) processes the payment 252 and sends notifications of the transaction 253 to the customer's email client 240(*a*).

FIG. 3A is a transactional flow diagram illustrating the generation of a short lookup token and long token for use in email-based payments. The vendor 302 requests an offer 304 from the e-commerce system's communication manager 303(*a*). The communication manager 303(*a*), in association with the library module 303(*c*), determines a long token and short lookup token are required 305 and shares a token request 306 with the token manager 303(*b*). The token manager 303(*b*) generates a long token and a corresponding short lookup token 307 associated with the vendor's offer. There may be more than one short lookup token. Alternatively, the long token may be a primary token with other corresponding secondary tokens, where the secondary token has more characters that the primary token. This, for example, may be for added security or other requirements. The token manager 303(*b*) shares the short lookup token 308 with the library module 303(*c*). The library module 303(*c*) shares the short lookup token 309 with the communication manager 303(*a*). The communication manager 303(*a*) shares the short lookup token 310 with the vendor system 302. This may be done using a variety of methods, such as a web interface or integration with the API. The vendor 302 generates an email offer message 311 containing the short lookup token. The vendor 302 shares the email offer message with the short lookup token 312 with the customer email client 301(*a*) on the customer device 301. Alternatively the offer message may come from the e-commerce system or a third party. There may be more than one offer contained in the email offer message. Each offer may be embedded in a mailto link containing the short token. Alternatively, the vendor may use other methods to share the short token.

FIG. 3B is a transactional flow diagram illustrating a process where a short lookup token is authenticated, translated, and matched with a long token to complete an email based payment. The customer using the customer device's email client 320(*a*) views the email offer message and selects the mailto link containing the short lookup token 323. This automatically generates a response email addressed to the e-commerce system and contains the short lookup token. The short lookup token may be anywhere in the response email. The email client 320(*a*) shares the response email containing the short lookup token 324 with the e-commerce system's communication manager 322(*a*). The communication manager 322(*a*) authenticates the response email 325. If the response email fails authentication, the e-commerce system 322 may send a confirmation message to the customer 320 with a URL link that drives customer to a signup page to complete the transaction. If the response email passes authentication, the communication manager 322(*a*) shares the short lookup token 326 with the library module 322(*c*). The library module 322(*c*), in association with the communication module 322(*a*), determines that a translation is required and shares the short lookup token 327 with the token manager 322(*b*). The short lookup token is translated 328 by the token manager 322(*b*) and matched with the long token. The long token is decoded.

The token manager 322(*b*), in association with the library module 322(*c*) determines the translation is complete and that the requirements are met 329, The library module 322(*c*) is updated 330. If requirements are not met, the e-commerce system 322 may send a confirmation message to the customer 320 with a URL link that drives the customer to a signup web page to complete the transaction. If the requirements are met and the library module 322(*c*) is updated, then the library module 322(*c*) shares a payment request 331 with the communication manager 322(*a*). The communication manager 322(*a*) processes the payment 332 and sends notifications of the transaction 333 to the customer's email client 320(*a*).

FIG. 4A is a transactional flow diagram illustrating the generation of a short lookup token, long token, and Short URL link for use in email-based payments. The vendor 402 requests an offer 404 from the e-commerce system's communication manager 403(*a*). The communication manager 403(*a*), in association with the library module 403(*c*), determines a long token, a short lookup token, and a short URL link are required 405 and shares a token request 406 with the token manager 403(*b*). The token manager 403(*b*) generates a long token and a corresponding short lookup token and short URL 407 associated with the vendor's offer. There may be more than one short lookup token and short URL link. Alternatively, the long token may be a primary token with other corresponding secondary tokens, where the secondary token has more characters that the primary token. This, for example, may be for added security or other requirements. The token manager 403(*b*) shares the short URL link 408 with the library module 403(*c*). The library module 403(*c*) shares the short URL link 409 with the communication manager 403(*a*). The communication manager 403(*a*) shares the short URL link 410 with the vendor system 402. The vendor 402 generates an email offer message containing the short URL Link 411. The vendor 402 shares the email offer message with the short URL Link 412 with the customer's email client 401(*a*) on the customer device.

FIG. 4B is an example of an offer email with a short URL link. Alternatively the offer message may come from the e-commerce system. There may be more than one offer 415/416 contained in the email offer message. Each offer 415 or 416 is associated with a short URL link. The short URL link may be embedded behind an image such as a button graphic. Alternatively the vendor may use other methods to share the short URL link.

FIG. 4C is a transaction flow diagram showing the use of a short token with a short URL link. The customer using the customer device's email client 420(*a*) views the email offer message and selects a short URL link 423. (415 in FIG. 4B) The selection of the short URL link 423 triggers the customer device's browser application 420(*b*) to open. The browser application 420(*b*) shares the short URL link 425 with the e-commerce system's communication manager 422(*a*) requesting the short lookup token. Alternatively the customer may select 416 in FIG. 4B and generate a specific total and request a token based on that amount. The activation of the browser application 420(*b*) may not be visible to the customer. The communication manager 422(*a*) authenticates the request and shares the short lookup token request 426 with the library module 422(*c*). The library module 422(*c*) is updated 427, and in association with the communication manager 422(*a*), determines that a short lookup token is required. The library module 422(*c*) shares the short lookup token request 428 with the token manager 422(*b*). The token manager 422(*b*) translates the short lookup token 429. The token manager 422(*c*) shares the short lookup token 430 with the library module 422(*c*). The library module 422(*c*) is updated 431. The library module 422(*c*) shares the short lookup token 433 with the communication manager 422(*a*). In this example, the short lookup token is contained in a mailto link. The communication manager 422(*a*) shares the mailto link with short lookup token 433 with the customer device's browser unit 420(*b*). The browser application 420(*b*) reads the mailto link with short lookup token and triggers the activation 434 of the customer device's email client 420(*a*).

FIG. 4D is a transactional flow diagram illustrating the process where a short token is returned to the e-commerce system and authenticated for payment processing. The email client 440(*a*) generates a response email 443 addressed to the e-commerce system that contains the short lookup token. The short lookup token may be located anywhere in the email. The customer device's email client 440(*a*) shares the email containing the short lookup token 444 with the e-commerce system's communication manager 442(*a*). The communication manager 442(*a*) authenticates the email 445. If authentication fails, the e-commerce system 442 may send the customer 440 a message containing a URL link that drives the customer to a URL signup web page to complete the transaction. If the authentication passes, the communication manager 440(*a*) shares the short lookup token 446 with the library module 442(*c*). The library module 442(*c*) is updated 447 and, in association with the communication manager 442(*a*), determines that a token decoding is required. The library module 442(*c*) shares the short lookup token 448 with the token manager 442(*b*). The token manager 442(*b*) decodes the short lookup token and translates the short token matching it with the long token 449. The long token is decoded. The token manager 442(*b*), in association with the library module 442(*c*), determines that requirements are met 450. The library module 442(*c*) is updated 451. If requirements are not met, the e-commerce system 442 may send a confirmation message to the customer 440 with a URL link that drives the customer to a signup web page to complete the transaction. If the requirements are met and the library module 442(*c*) updated, then the library module 442(*c*) shares a payment request 452 with the communication manager 442(*a*). The communication manager 442(*a*) processes the payment 453 and sends notifications of the transaction 454 to the client's email client 440(*a*).

FIG. 5A is a transactional flow diagram of short look up token generation via a web-browser checkout for email-based payments. The vendor 502 requests an offer 504 from the e-commerce system's communication manager 503(*a*) for use on a web checkout. The communication manager 503(*a*), in association with the library module 503(*c*), determines a long token and a short look up token are required 505 and shares a token request 506 with the token manager 503(*b*). The token manager 503(*b*) generates a long token and a corresponding short look up token 507 associated with the vendor's offer. There may be more than one short look up token that corresponds to the long token. Alternatively, the long token may be a primary token with other corresponding secondary tokens, where the secondary token has more characters that the primary token. This, for example, may be for added security. The token manager 403(*b*) shares the short look up token 508 with the library module 503(*c*). The library module 503(*c*) shares the short look up token 509 with the communication manager 503(*a*). The communication manager 503(*a*) shares the short look up token 510 with the vendor system 502. The short token may be in a mailto link. The vendor 502 shares the short token 511 with the customer device's browser application 501(*b*). Each offer is associated with a mailto link containing a short token. There may be more than one offer posted on the browser page. The browser page may be a checkout generating a total for a number of items. The browser page may be a list of items gathered from multiple vendors.

FIG. 5B is a transactional flow diagram illustrating where a short look up token is authenticated and matched with a long token to complete an email-based payment on a web-checkout. The customer using the customer device's browser application 520(*b*) views the offer and selects the mailto link 523 containing the short look up token. The selection of the mailto 523 link triggers the customer device to open the email client 520(*a*). This automatically generates a response email 524 addressed to the e-commerce system and contains the short lookup token. The short lookup token may be anywhere in the response email. The email client 520(*a*) shares the response email containing the short lookup token 525 with the e-commerce system's communication manager 522(*a*). The communication manager 522(*a*) authenticates the response email 526. If the response email is not authenticated, the e-commerce system 522 may send a confirmation message to the customer 520 with a URL link that drives the customer to a signup page to complete the transaction. If the response email is authenticated, the communication manager 522(*a*) shares the short lookup token 527 with the library module 522(*c*). The library module 522(*c*), in association with the communication manager 522(*a*), determines that a translation is required and shares the short lookup token 528 with the token manager 522(*b*). The short lookup token is translated 529 by the token manager 522(*b*) and matched with the long token. The token manager 522(*b*), in association with the library module 522(*c*), determines the translation is complete that requirements are met 530. The library module 522(*c*) is updated 531. If requirements are not met, the e-commerce system 522 may send a confirmation message to the customer 520 with a URL link that drives the customer to a signup page to complete the transaction. If the requirements are met and the library module 522(*c*) is updated, then the library module 522(*c*) shares a payment request 532 with the communication manager 522(*a*). The communication manager 522(*a*) processes the payment 533 and sends notifications of the transaction 534 to the customer's email client 520(*a*).

FIG. 5C is a transactional flow diagram of short URL link generation with tokens via a web-browser checkout for email-based payments. The vendor 541 requests an offer 543 from the e-commerce system's communication manager 542(*a*). The communication manager 542(*a*), in association with the library module 542(*c*), determines a long token, a short lookup token, and a short URL link are required 544 and shares a token request 545 with the token manager 542(*b*). The token manager 542(*b*) generates a long token, a corresponding short lookup token, and a corresponding short URL link 546 associated with the vendor's offer. There may be more than one short lookup token that corresponds to the long token. Alternatively, the long token may be a primary token with other corresponding secondary tokens, where the secondary token may have greater or lesser number of characters, but is contingent on translation. This may be for the purpose of security or some other feature. The token manager 542(*b*) shares the short URL link 547 with the library module 542(*c*). The library module 542(*c*) shares the short URL link 548 with the communication manager 542 (*a*). The communication manager 542(*a*) shares the short URL link 549 with the vendor system 541. The vendor 541 shares the short URL link 550 with the customer device's browser application 540(*b*). Each offer is associated with a short URL link. There may be more than one offer posted on the browser page. The browser page may be a checkout generating a total for a number of items. The browser page may be a list of items gathered from multiple vendors.

FIG. 5D is a transaction flow diagram showing the use of a short lookup token with a short URL link in a web browser checkout. The customer using the customer device's web browser application 560(*b*) views the offer page and selects a URL link 563. The browser application 560(*b*), based on the short URL address, shares the token request 564 with the e-commerce system's communication manager 562(*a*). The activation of the browser application may not be visible to the customer. The communication manager 562(*a*) authenticates the request 565 and shares the short lookup token request 566 with the library module 562(*c*). The library module 562(*c*) is updated and, in association with the communication manager 562(*a*), determines that a short lookup token is required. The library module 562(*c*) shares the short lookup token request 568 with the token manager 562(*b*). The token manager 562(*b*) retrieves the short lookup token 569. The token manager 562(*b*) shares the short token 570 with the library module 562(*c*) and the library module 562(*c*) is updated 571. The library module 562(*c*) shares the short token 572 with the communication manager 562(*a*). In this example, the short token is contained in a mailto link. The communication manager 562(*a*) shares the mailto link with short token 573 with the customer device's browser unit 560(*b*). The browser application 560(*b*) reads the mailto link with token and triggers the activation 574 of the customer device's email client 560(*a*). The customer device's email client 560(*a*) generates a response email 575.

FIG. 5E is a transactional flow diagram illustrating the process where a short lookup token is returned to the e-commerce system and authenticated for payment processing in a web checkout. The email client 580(*a*) generates a response email 583 addressed to the e-commerce system 582 which contains the short lookup token. The short lookup token may be located anywhere in the email. The customer device's email client 580(*a*) shares the email containing the short lookup token 584 with the e-commerce system's communication manager 582(*a*). The communication manager 582(*a*) authenticates the email 585. If authentication fails, the e-commerce system 582 may send the customer 580 a message containing a URL link that drives the customer to a URL signup web page to complete the transaction. If authentication passes, the communication manager 582(*a*) shares the short lookup token 586 with the library module 582(*c*). The library module 582(*c*) is updated 587 and, in association with the communication manager 582(*c*), determines that a token decoding is required and shares the short lookup token 588 with the token manager 582(*b*). The token manager 582(*b*) decodes the short lookup token 589. The short lookup token is translated and matched with the long token. The long token is decoded. The token manager 582(*b*), in association with the library module 582(*c*), determines that the requirements are met 590 and the library module 582(*c*) is updated 591. If requirements are not met, the e-commerce system 582 may send a confirmation message to the customer 580 with a URL link that drives the customer to a signup page to complete the transaction. If the requirements are met, and the library module 582(*c*) updated 591, then the library module 582(*c*) shares a payment request 592 with the communication manager 582(*a*). The communication manager 582(*a*) processes the payment 593 and sends notifications of the transaction 594 to the customer device's email client 580(*a*). Alternatively the notifications of transaction 594 may be sent to the customer device's web browser 580(*b*) (not shown).

FIG. 6A is a transactional flow diagram illustrating the generation of a short lookup token, long token, and Short URL link for use in a secure web logon and/or web checkout. The vendor 602 requests an offer 604 from the e-commerce system's communication manager 603(*a*). The communication manager 603(*a*), in association with the library module 603(*c*), determines a long token, a short lookup token, and a short URL link are required 605 and shares a token request 606 with the token manager 603(*b*). The token manager 603(*b*) generates a long token, a corresponding short lookup token, and a short URL that is associated with the vendor's offer 607. There may be more than one short lookup token and short URL link. Alternatively, the long token may be a primary token with other corresponding secondary tokens where the secondary token has more characters that the primary token. This for example may be for added security or other requirements. The token manager 603(*b*) shares the short URL link 608 with the library module 603(*c*). The library module 603(*c*) is updated 609. The library module 603(*c*) shares the short URL link 610 with the communication manager 603(*a*). The communication manager 603(*a*) shares the short URL link 611 with the vendor system 602. The vendor 602 generates the email offer message containing the short URL link 612. The vendor 602 shares the email offer message with the short URL link 613 with the customer's email client 601(*a*) on the customer device. Alternatively, the offer message may come from the e-commerce system. There may be more than one offer contained in the email offer message. Each offer is associated with a short URL link and a token. The short URL link may be embedded behind an image such as a button graphic. Alternatively, the vendor may use other methods to share the short token.

FIG. 6B is a transactional flow diagram illustrating the generation of a short lookup token, a long token and a Short URL link for use in a secure web logon and/or web checkout. The customer 620, using the customer device's email client 620(*a*), views the email or offer message and selects a URL link 623. The selection of the short URL link triggers the customer device's browser application 620(*b*) to open 624 and for the browser application 620(*b*) to share the short URL 625 with the e-commerce system's communication manager 622(*a*). Alternatively, the customer may select another link, generate a specific total, and then request a token based on that amount. The activation of the browser application 620(*b*) may display graphic information about pending charges. The communication manager 622(*a*) authenticates the request 626. If authentication fails, the customer 620 may be driven to a web based sign up to complete the transaction. If authentication passes, the communication manager 622(*a*) requests and shares the short URL 627 with the library module 622(*c*). The library module 622(*c*) is updated 628 and, in association with the communication manager 622(a), determines that a short lookup token is required and shares the short lookup token request 629 with the token manager 622(b). The token manager 622(b) retrieves the short lookup token. The token manager 622(b) decodes and translates the short lookup token 630 matching it with the long token. The long token is decoded. The token manager 622(b), in association with the library module 622(c), determines that requirements are met 631 and the library module 622(c) is updated 632. If requirements are not met, the e-commerce system 622 may send a confirmation message to the customer 620 with a URL link that drives the customer 620 to a signup web page to complete the transaction. If the requirements are met, the library module 622(c) shares a payment request 633 with the communication manager 622(a). The communication manager 622(a) processes the payment 634 and sends notifications of the transaction 635 to the customer device's web browser application 622(b) acknowledging the transaction is no longer pending and is now complete. The customer is now securely logged on 636. The notification may also be used as a final confirmation of the first payment, another offer, required information such as delivery information or access to secure account information. The customer 620 can share updates and changes to their account 637 with the e-commerce system's communication manager 622(a). The communication manager 622(a) authenticates the requests 638.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method that utilizes Simple Mail Transfer Protocol (SMTP) to improve security of an e-commerce computer system, the method comprising:
receiving, by the e-commerce computer system, a request for a transaction from a third party, wherein the transaction enables a particular registered user to access a secure webpage hosted by the third party;
in response to receiving the request:
generating, by the e-commerce computer system, a short lookup token for the transaction, wherein the short lookup token identifies the particular registered user and is unique to the transaction, and
configuring, by the e-commerce computer system, a transaction email address to contain the short lookup token in a local part of the transaction email address, wherein the e-commerce computer system receives email via the transaction email address;
receiving, by the e-commerce computer system, a response email from a sender via SMTP, wherein the response email is addressed to the transaction email address;
ascertaining, by the e-commerce computer system, the particular registered user based on the short lookup token contained in the local part of the transaction email address;
authenticating, by the e-commerce computer system, the response email by determining that the response email was received from the particular registered user based on an email address of the sender of the response email; and
on a condition that the response email is successfully authenticated:
determining, by the e-commerce computer system, a long token associated with the short lookup token, wherein the long token includes additional information about the transaction not included in the short lookup token,
processing, by the e-commerce computer system, the transaction utilizing the additional information included in the long token; and
logging, by the e-commerce computer system, the particular registered user on to the secure webpage based on the processing, wherein the particular registered user is logged onto to the secure webpage by transmitting a notification to a browser of the particular registered user.

2. The method of claim 1, wherein the short lookup token is embedded in a mailto link.

3. The method of claim 1, wherein on a condition that the response email is not successfully authenticated, the sender is directed to a signup web page to complete the transaction.

4. The method of claim 1, wherein the e-commerce computer system stores the short lookup token and the long token associated with the short lookup token.

5. The method of claim 1, wherein a short URL link is associated with the short lookup token.

6. The method of claim 5, wherein the third party generates an email message including the short URL link that is sent to the particular registered user.

7. The method of claim 1, wherein the determining that the response email was received from the particular registered user includes performing an authentication of the email address of the sender using at least one of DomainKeys Identified Mail (DKIM) and Sender Policy Framework (SPF) protocols.

8. The method of claim 5, wherein the response email is received in response to activating the short URL link.

9. An e-commerce computer system that utilizes Simple Mail Transfer Protocol (SMTP) to improve security of an e-commerce transaction, the e-commerce computer system comprising:
a memory;
a communication interface that is communicatively coupled to a client device via a network; and
a processor communicatively coupled to the communication interface and the memory;
wherein the processor is configured to:
receive, using the communication interface, a request for a transaction from a third party, wherein the transaction enables a particular registered user to access a secure webpage hosted by the third party,
in response to receiving the request:
generate a short lookup token for the transaction, wherein the short lookup token identifies the particular registered user and is unique to the transaction; and
configure, a transaction email address to contain the short lookup token in a local part of the transaction email address, wherein the e-commerce computer system receives email via the transaction email address;

receive, using the communication interface, a response email from a sender via SMTP, wherein the response email is addressed to the transaction email address, ascertain the particular registered user based on the short lookup token contained in the local part of the transaction email address, authenticate the response email by determining that the response email was received from the particular registered user based on an email address of the sender of the response email, and on a condition that the response email is successfully authenticated:

determine a long token associated with the short lookup token based on information stored in the memory, wherein the long token includes additional information about the transaction not included in the short lookup token;

process the transaction utilizing the additional information included in the long token; and log the particular registered user on to the secure webpage based on the transaction being processed, wherein the particular registered user is logged onto to the secure webpage by transmitting a notification to a browser of the particular registered use.

10. The e-commerce computer system of claim 9, wherein the short lookup token is embedded in a mailto link.

11. The e-commerce computer system of claim 9, wherein on a condition that the response email is not successfully authenticated, the sender is directed to a signup web page to complete the transaction.

12. The e-commerce computer system of claim 9, wherein the memory further stores the short lookup token and the long token associated with the short lookup token.

13. The e-commerce computer system of claim 9, wherein a short URL link is associated with the short lookup token.

14. The e-commerce computer system of claim 13, wherein the third party generates an email message including the short URL link that is sent to the particular registered user.

15. The e-commerce computer system of claim 9, wherein the determining that the response email was received from the particular registered user includes performing an authentication of the email address of the sender using at least one of DomainKeys Identified Mail (DKIM) and Sender Policy Framework (SPF) protocols.

16. The e-commerce computer system of claim 13, wherein the response email is received in response to activating the short URL link.

17. A non-transitory computer readable storage medium that stores instructions for utilizing Simple Mail Transfer Protocol (SMTP) to improve security of an e-commerce computer system, the instructions when executed by a processor of the e-commerce computer system cause the processor to execute a method, the method comprising:

receiving a request for a transaction from a third party, wherein the transaction enables a particular registered user to access a secure webpage hosted by the third party;

in response to receiving the request:

generating a short lookup token for the transaction, wherein the short lookup token identifies the particular registered user and is unique to the transaction, and configuring a transaction email address to contain the short lookup token in a local part of the transaction email address, wherein the e-commerce computer system receives email via the transaction email address;

receiving a response email from a sender via SMTP, wherein the response email is addressed to the transaction email address;

ascertaining the particular registered user based on the short lookup token contained in the local part of the transaction email address;

authenticating the response email by determining that the response email was received from the particular registered user based on an email address of the sender of the response email; and on a condition that the response email is successfully authenticated:

determining a long token associated with the short lookup token, wherein the long token includes additional information about the transaction not included in the short lookup token, processing the transaction utilizing the additional information included in the long token, and logging the particular registered user on to the secure webpage based on the processing, wherein the particular registered user is logged onto to the secure webpage by transmitting a notification to a browser of the particular registered user.

18. The non-transitory computer readable storage medium of claim 17, wherein the determining that the response email was received from the particular registered user includes performing an authentication of the email address of the sender using at least one of DomainKeys Identified Mail (DKIM) and Sender Policy Framework (SPF) protocols.

* * * * *